United States Patent
Heise et al.

(10) Patent No.: US 10,865,112 B2
(45) Date of Patent: Dec. 15, 2020

(54) MODIFIED TRACK-ETCHED SUBSTRATES FOR COMPOSITE GRAPHENE MEMBRANES

(71) Applicant: LOCKHEED MARTIN CORPORATION, Bethesda, MD (US)

(72) Inventors: Scott E. Heise, Palo Alto, CA (US); Han Liu, Middle River, MD (US); Jacob L. Swett, Pleasant Hill, MO (US); Michael J. Hiltabidle, Moorestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 18 days.

(21) Appl. No.: 16/218,859

(22) Filed: Dec. 13, 2018

(65) Prior Publication Data
US 2020/0189914 A1    Jun. 18, 2020

(51) Int. Cl.
*C01B 32/194*    (2017.01)

(52) U.S. Cl.
CPC ........ *C01B 32/194* (2017.08); *C01B 2204/04* (2013.01)

(58) Field of Classification Search
CPC .............. B01D 71/021; B01D 67/0079; B01D 2325/04; B01D 69/02; B01D 71/02; B01D 71/024; B01D 2325/02; B01D 67/0062; B01D 71/68
See application file for complete search history.

(56) References Cited

U.S. PATENT DOCUMENTS

| | | | |
|---|---|---|---|
| 2014/0021133 A1* | 1/2014 | Siwy | B01D 71/02 210/650 |
| 2016/0009049 A1* | 1/2016 | Stoltenberg | B01D 69/10 428/137 |
| 2017/0037356 A1* | 2/2017 | Simon | B01D 39/2055 |
| 2018/0319943 A1* | 11/2018 | Liu | C09D 169/00 |
| 2020/0062600 A1* | 2/2020 | Kidambi | C01B 32/186 |

OTHER PUBLICATIONS

P. Yu. Apel et al, Effect of naosized surfactant molecules on the etching of ion tracks: New degrees of freedom in desing of pore shape; Science Directs, 2003.*

* cited by examiner

*Primary Examiner* — Ana M Fortuna
(74) *Attorney, Agent, or Firm* — Foley & Lardner LLP

(57) ABSTRACT

Modified substrates are provided having nano- or microscale wells, tracks, channels, pores or perforations. Also provided are methods of making the same.

27 Claims, 12 Drawing Sheets

A vertical and horizontal alignment

B offset alignment

MODIFIED TRACK-ETCHED SUBSTRATES FOR COMPOSITE GRAPHENE MEMBRANES

FIELD

This disclosure generally relates to modified substrates and methods for their production, and more specifically, to forming or modifying various substrates that may be used in relation to separation membranes.

BACKGROUND

Track-etched substrates are useful alone or in combination with graphene or other 2D or low dimensional materials as porous membranes. Permeability and selectivity of such membranes can be controlled through the introduction of pores, perforations, wells, and various other modifications to the substrates at the micro- and nanoscale.

The use of substrates as stand-alone membranes, or to offer rigidity or support to layers of ultra-thin membranes including graphene, is of considerable interest. There exists a need for modified substrates with increased permeability and strength and methods of making the same. The present disclosure satisfies this need and provides related advantages as well.

SUMMARY

In an embodiment, a modified substrate is provided that may include a first face and an opposite facing second face a distance from each other defining a thickness; a first plurality of track-etched pores through the substrate; and a well in the first face of the substrate, wherein the well may be from 1 to 1,500 μm in diameter, and wherein the well may comprise a bottom surface that may be 1 to 10 μm from the second face of the substrate.

in an embodiment, a modified substrate is provided, comprising a first face and an opposite facing second face a distance from each other defining a thickness; a first plurality of pores through the substrate, that may include about $1\times10^5$ to $1\times10^{11}$ pores per cm$^2$ of substrate and the pores may have an average diameter between 10-10,000 nm; and a second plurality of pores through the substrate, comprising pores that may have an average diameter of up to 50% the average diameter of the pores of the first plurality of pores, wherein the second plurality of pores may be comprised of $1\times10^7$ to $1\times10^{13}$ pores per cm$^2$ of substrate.

In an embodiment, a process for modifying a track-etched substrate is provided, the process comprising providing a track-etched substrate comprising a first face and an opposite facing second face a distance from each other defining a thickness, wherein the track-etched substrate comprises a first plurality of pores through the substrate; and treating the substrate to produce a well in the first face of the substrate, wherein the well may be from 1 to 10,000 μm in diameter, and wherein the well may comprise a bottom surface that may be 1 to 10 μm from the second face of the substrate.

In an embodiment, a process for modifying a track-etched substrate is provided, the process comprising providing a track-etched substrate comprising a first face and an opposite facing second face a distance from each other defining a thickness, wherein the track-etched substrate comprises a first plurality of pores through the substrate; ion-bombarding the substrate to produce a plurality of damage tracks; and track-etching the substrate to produce a second plurality of pores, wherein the first plurality of pores may comprise about $1\times10^5$ to $1\times10^{11}$ pores per cm$^2$ of substrate and pores that may have an average diameter between 10-10,000 nm, and the second plurality of pores may comprise pores having an average diameter of up to 50% the average diameter of the pores of the first plurality of pores, and wherein the second plurality of pores may be comprised of $1\times10^7$ to $1\times10^{13}$ pores per cm$^2$ of substrate.

In an embodiment, a process for modifying a substrate is provided comprising casting, laser milling, imprinting, photolithographing, etching, or a combination thereof, a substrate material to produce a substrate that may have a first face and an opposite facing second a distance from each other defining a thickness, and that may have a well in the first face, wherein the well may be from 1 to 10,000 μm in diameter, and wherein the well may comprise a bottom surface that may be 1 to 10 μm from the second face of the substrate; ion-bombarding the substrate to produce a plurality of damage tracks through the substrate; and etching the substrate to produce a first plurality of pores through the substrate.

BRIEF DESCRIPTION OF THE DRAWINGS

FIG. 6A shows horizontally and vertically aligned wells. FIG. 6B shows offset alignment of wells.

DETAILED DESCRIPTION

Some embodiments include compositions, substrates, and processes for modifying a substrate, upon which a graphene, graphene-based or other two-dimensional material, including perforated graphene or a perforated graphene-based material, may be subsequently deposited. In general, the terms and phrases used herein have their art-recognized meaning, which can be found by reference to standard texts, journal references, and contexts known to those skilled in the art.

In an embodiment, a modified substrate may include a first face and an opposite facing second face a distance from each other defining a thickness; a first plurality of track-etched pores through the substrate; and a well in the first face of the substrate, wherein the well may comprise a bottom surface.

In an embodiment, the well may be from 1 to 1,500 µm in diameter. In an embodiment, the well may be from 1 to 1,000 µm in diameter. In an embodiment, the well may be from 1 to 200 µm in diameter. In an embodiment, the well may be from 200 to 400 µm in diameter. In an embodiment, the well may be from 400 to 600 µm in diameter. In an embodiment, the well may be from 600 to 800 µm in diameter. In an embodiment, the well may be from 800 to 1,000 µm in diameter.

In an embodiment, the bottom surface of the well may be up to 100 µm from the second face of the substrate. In an embodiment, the bottom surface of the well may be from 1 to 10 µm from the second face of the substrate. In an embodiment, the bottom surface may be from 1 to 3 µm from the second face of the substrate. In an embodiment, the bottom surface may be from 3 to 6 µm from the second face of the substrate. In an embodiment, the bottom surface may be from 6 to 9 µm from the second face of the substrate. In an embodiment, the bottom surface may be from 9 to 10 µm from the second face of the substrate. The bottom surface may be measured from the point on the bottom surface which is closest to the second face of the substrate.

In an embodiment, the substrate comprises a plurality of wells. In some embodiments the well is cylindrical, cubic, conic, tetrahedral, helical, pyramidal, a torus, hexahedral, octahedral, or any combination thereof, and may be present in any size or orientation within the thickness of the substrate. In an embodiment, the modified substrate may include a plurality of wells interconnected by channels. In some embodiments the width of the channel is equal to that diameter or width of a well.

Figure 6:
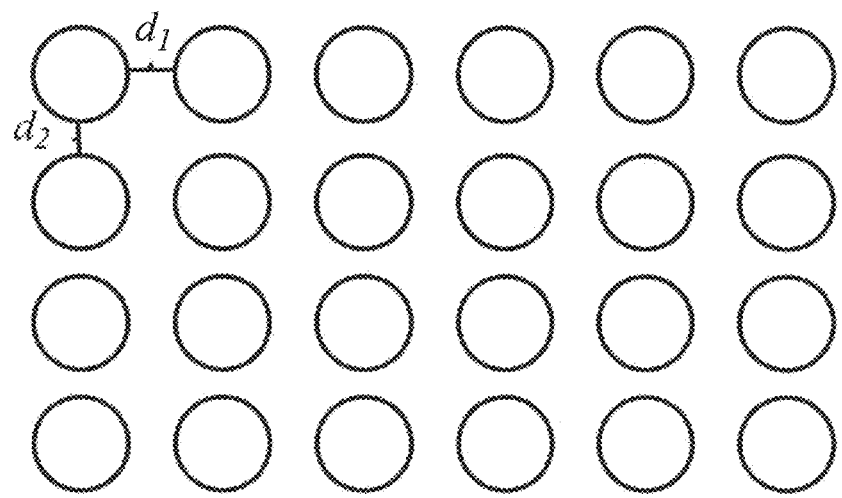
FIG. 6 illustrates well arrangements described herein.
Figure 6:
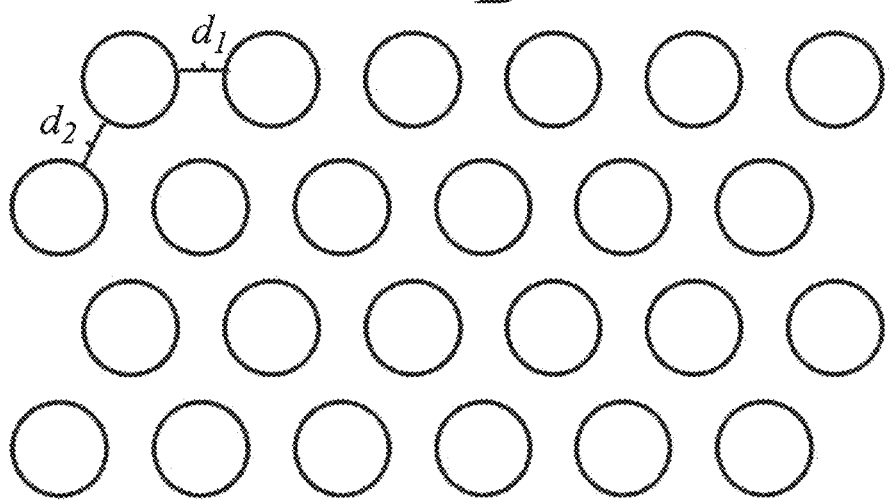
Figure 7:
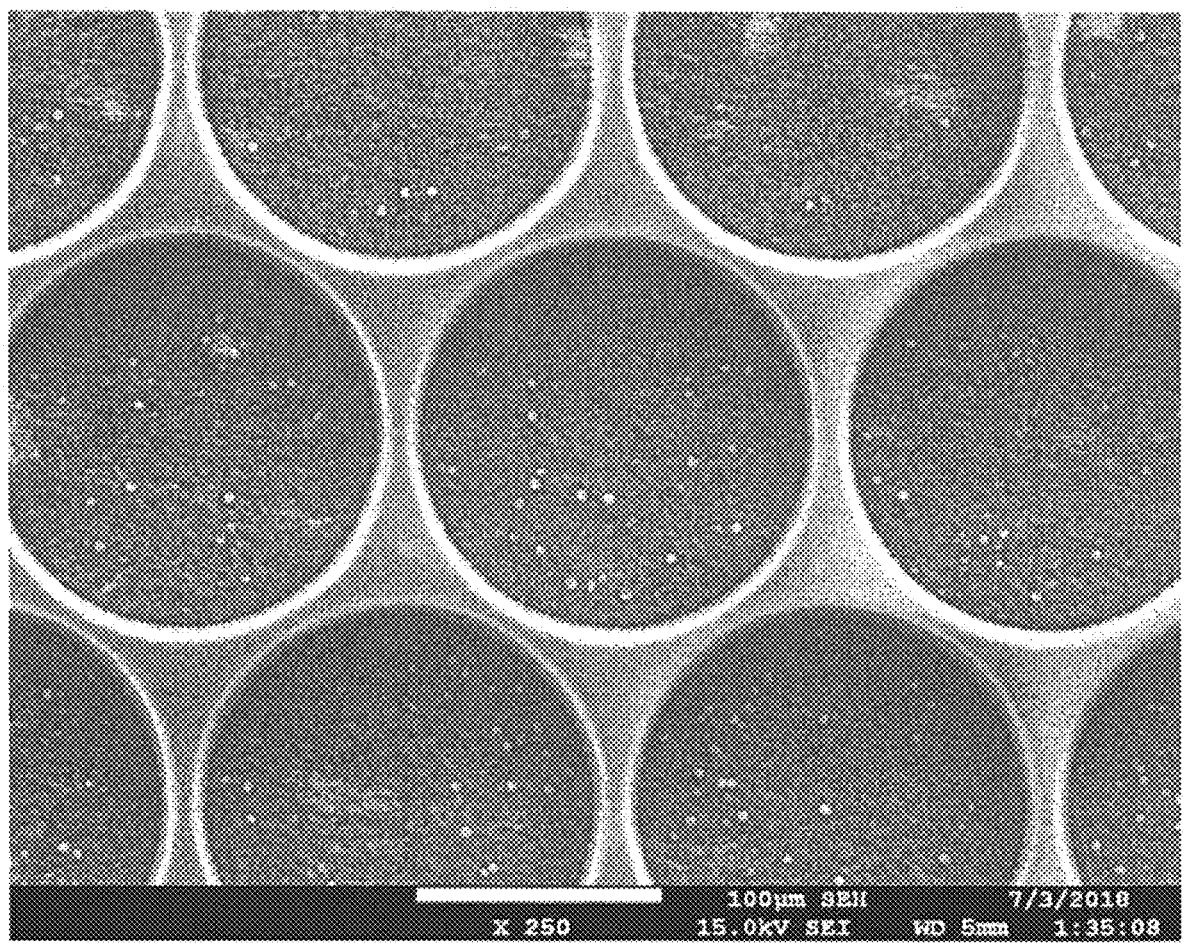
FIG. 7 is a scanning electron microscope (SEM) image of a modified substrate of some embodiments, The image is an aerial view of the first face of a modified substrate. Wells (dark) and the first face (light) are shown.
Figure 8:
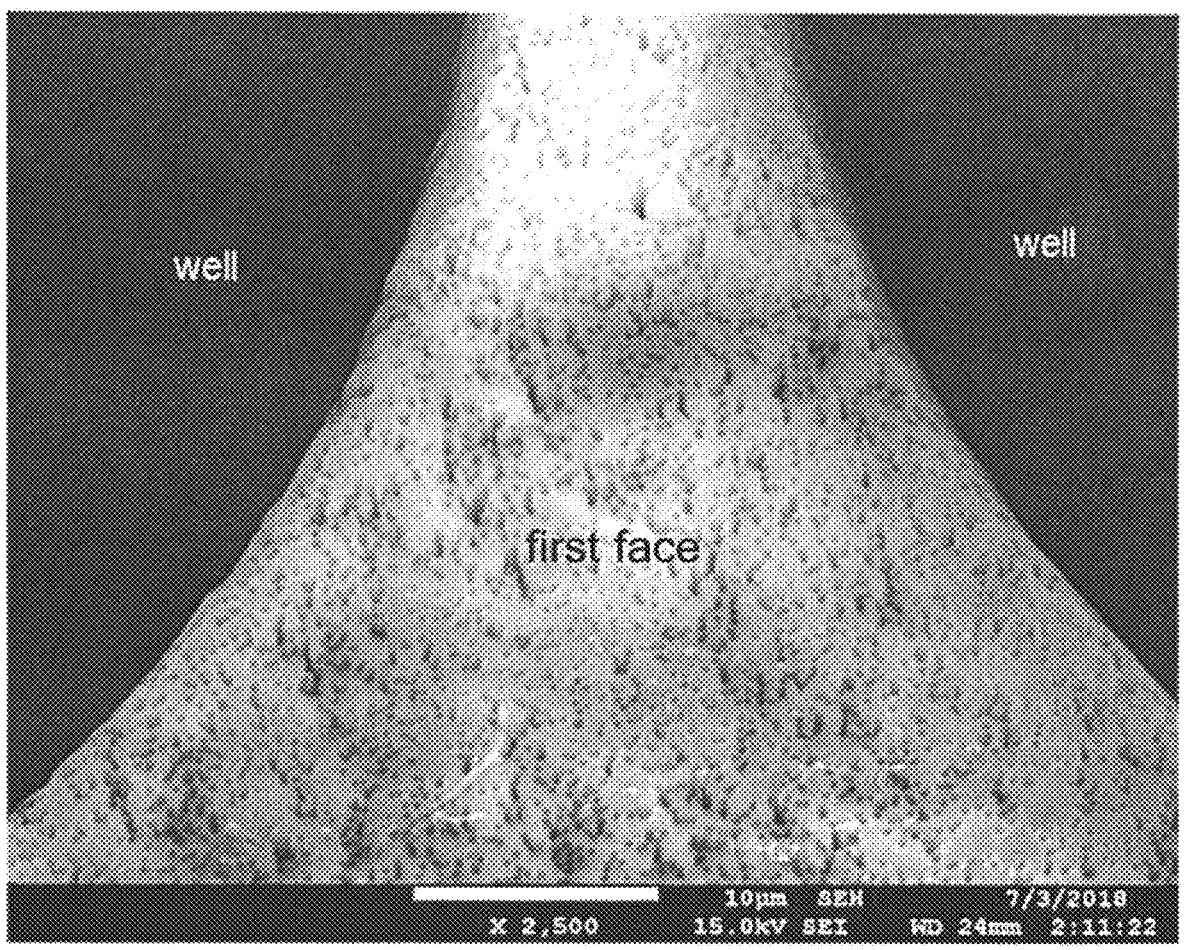
FIG. 8 is a close up of FIG. 7. Track-etched pores through the first face of the substrate are visible.
Figure 9:
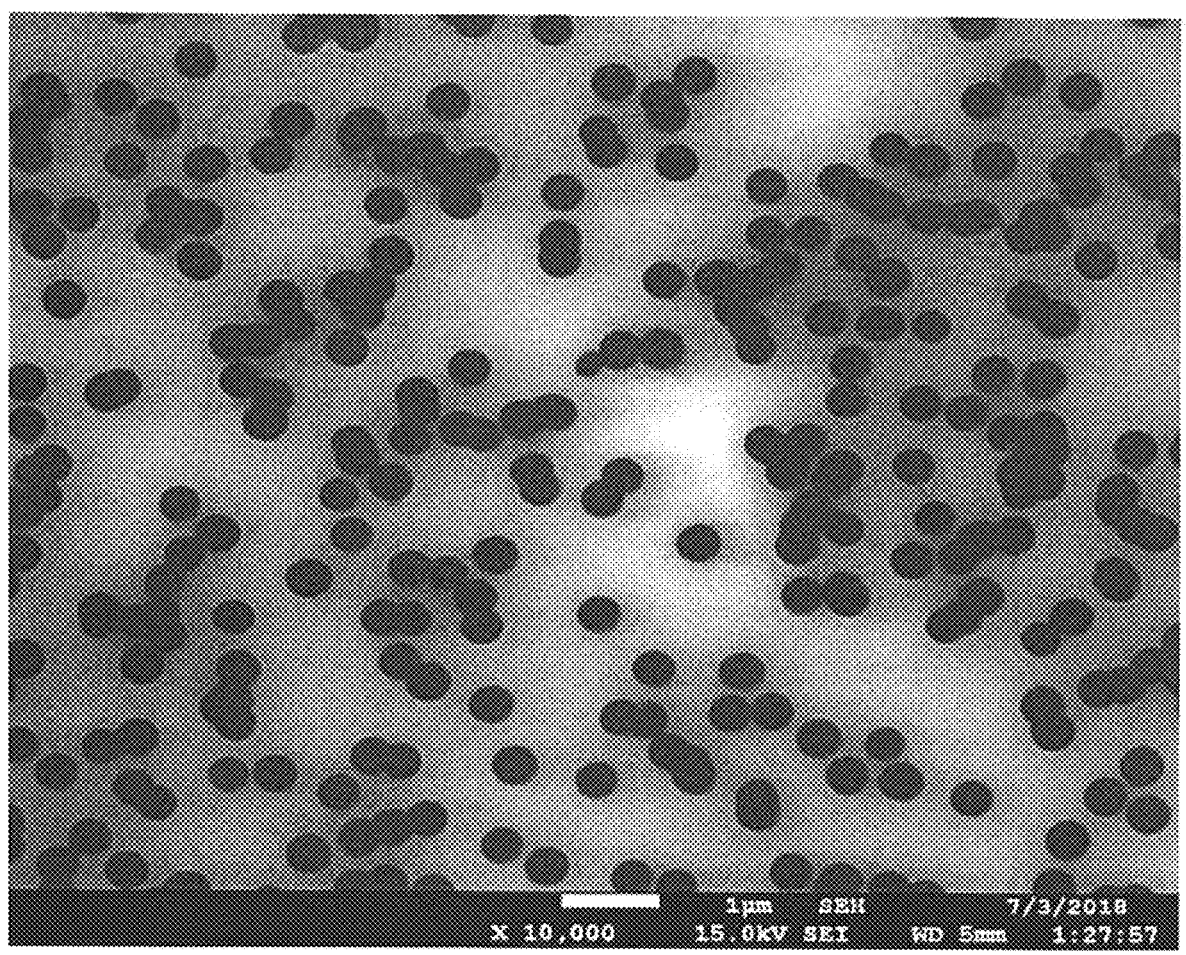
FIG. 9 is a SEM image of the bottom surface of a well described herein. Track-etched pores (dark spots) are seen on the bottom surface.
Figure 10:
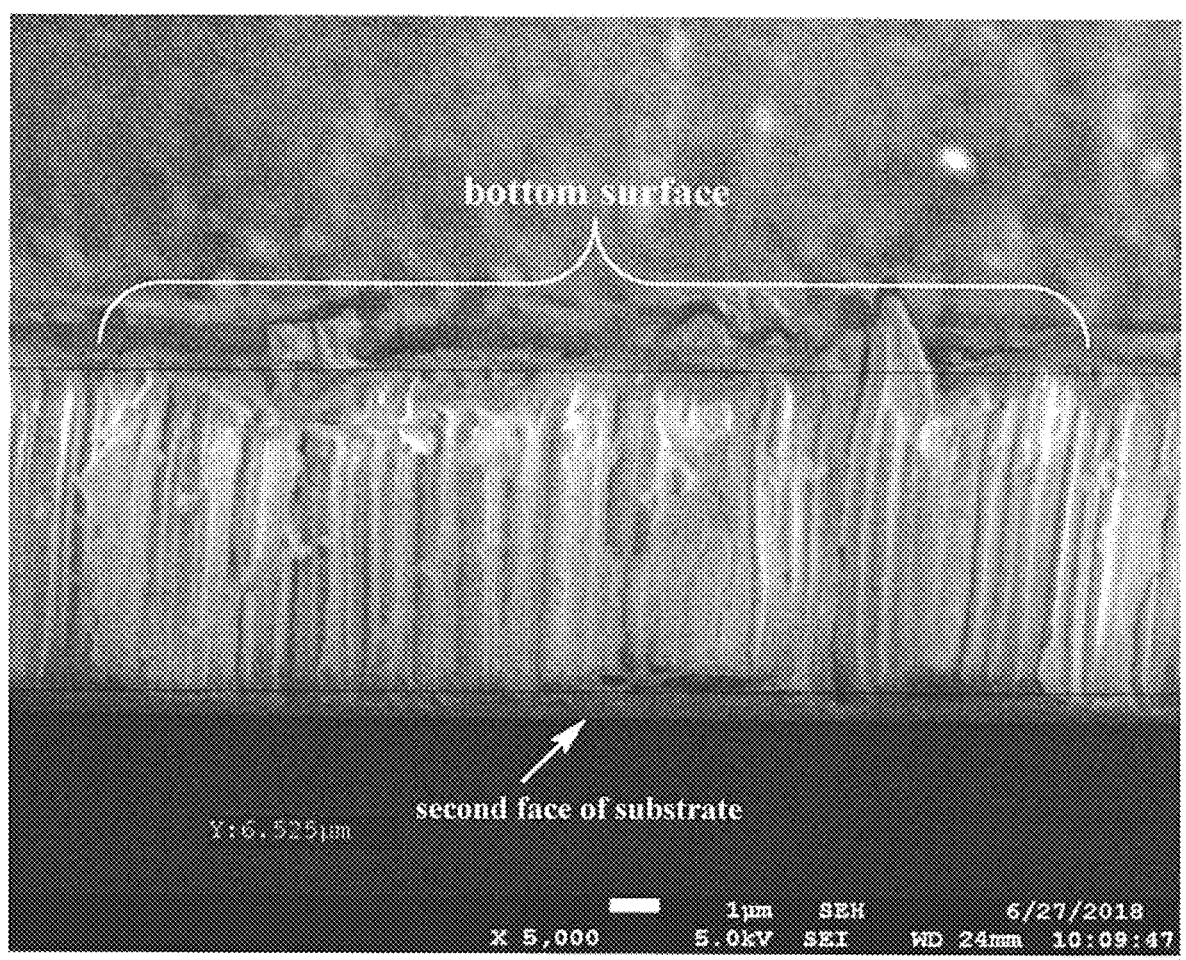
FIG. 10 is a SEM image of a close-up cross section showing the bottom of a well and the second face of a modified substrate described herein.
Figure 11:
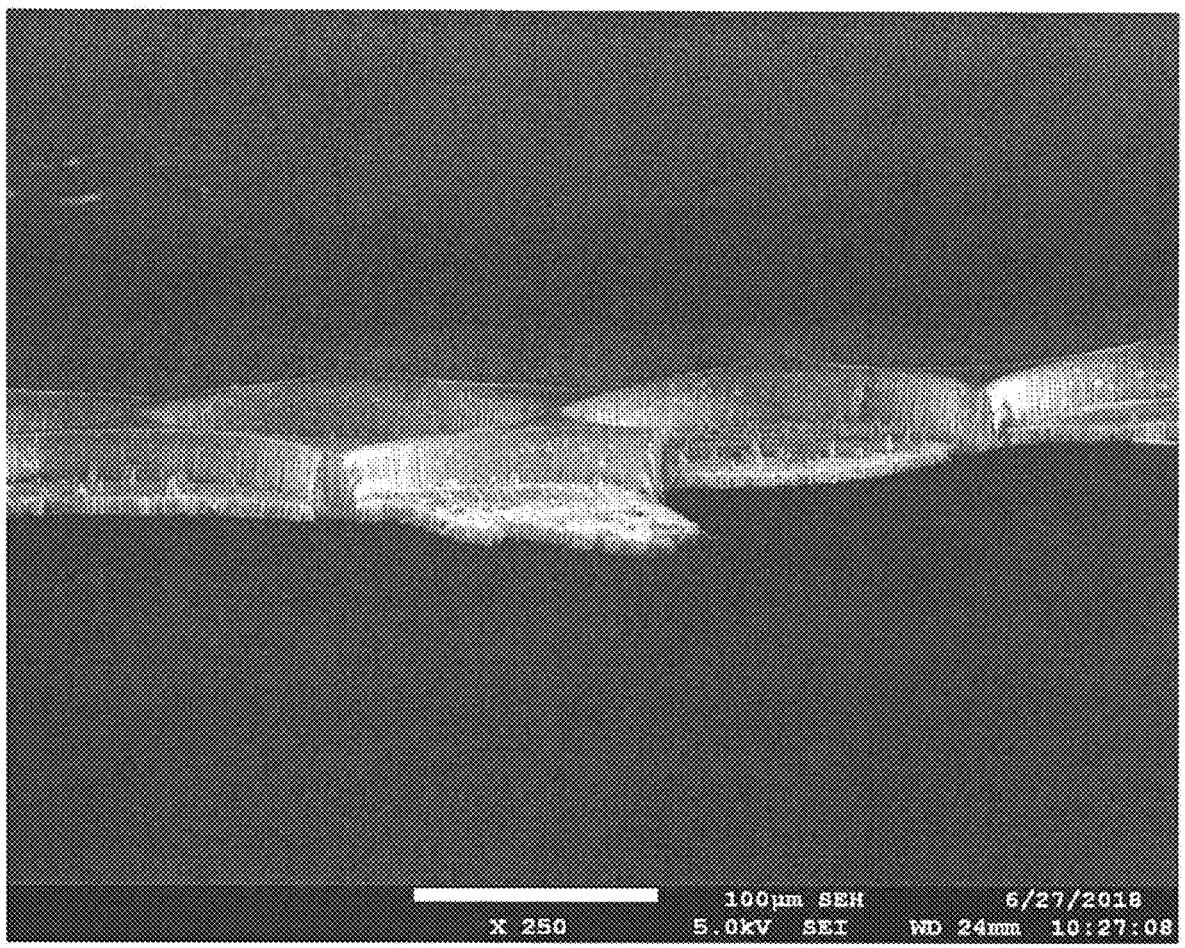
FIG. 11 is a SEM image of a cross section of a modified substrate described herein.
Figure 12:
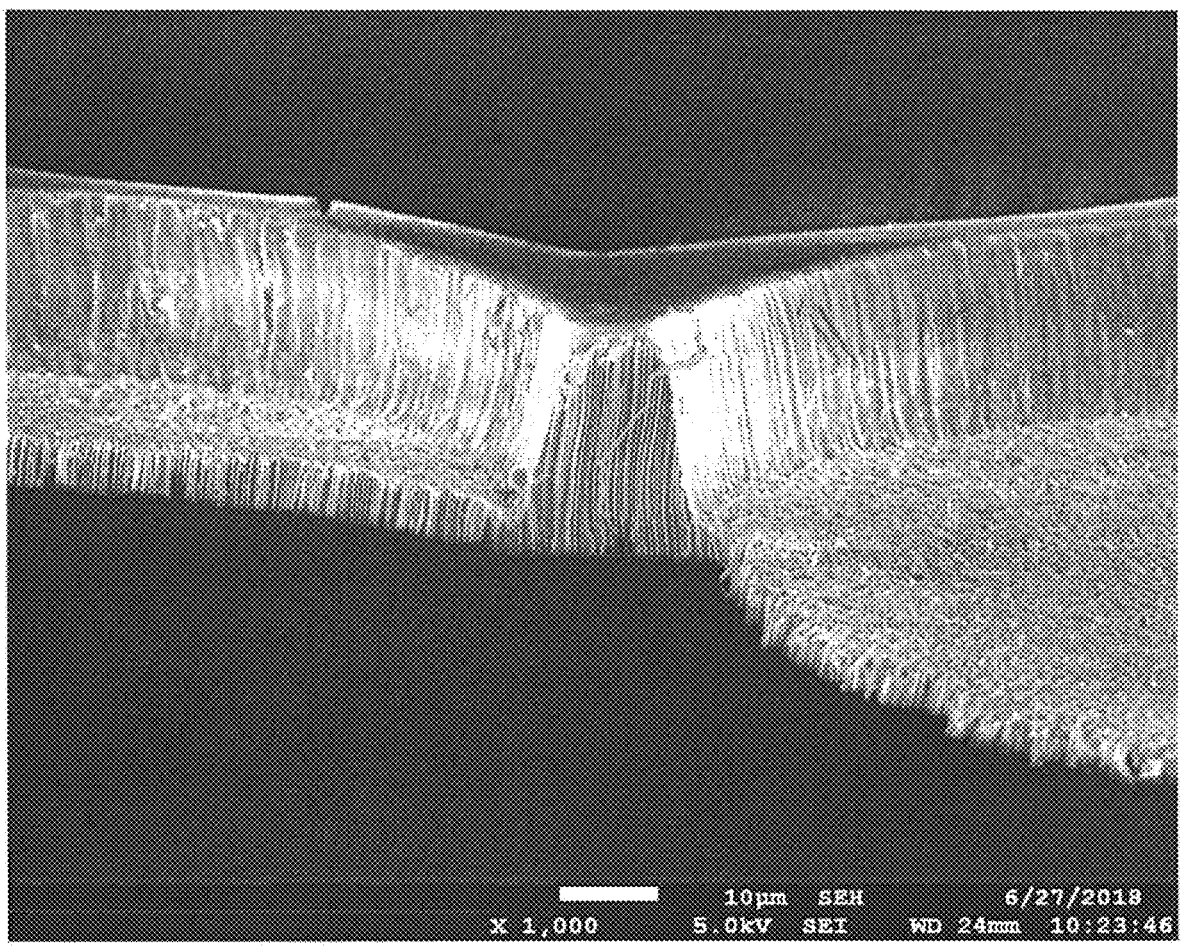
FIG. 12 is a close up SEM image of the cross section of FIG. 11.

In an embodiment, the substrate comprises a plurality of wells that are horizontally and vertically aligned (FIG. 6A). In an embodiment, the substrate comprises a plurality of wells with an offset alignment (FIG. 6B). Referring to FIGS. 6A and 6B, distances between adjacent wells, $d_1$ and $d_2$, are each independently selected from between 5 to 1,000 µm.

In an embodiment, a modified substrate may include a first face and an opposite facing second face a distance from each other defining a thickness; a first plurality of pores through the substrate, comprising about $1\times10^5$ to $1\times10^{11}$ pores per cm$^2$ of substrate and pores having an average diameter between 10-10,000 nm; and a second plurality of pores through the substrate, comprising pores having an average diameter of up to 50% the average diameter of the pores of the first plurality of pores, wherein the second plurality of pores is comprised of $1\times10^7$ to $1\times10^{13}$ pores per cm$^2$ of substrate. To verify pores per cm$^2$, the skilled artisan may image areas of 500 nm×500 nm across a substrate and then extrapolate to larger areas.

The presence, size and or location (or approximate location) of pores, wells and perforations described herein can be assessed using various imaging methods (including optical microscopy, scanning electron microscopy, scanning probe microscopy, scanning tunneling microscopy, atomic force microscopy, transmission electron microscopy, etc.); detecting analyte, particles or ions passing through pores (using mass spectrometry, secondary mass spectrometry, Raman spectroscopy, residual gas analysis, detecting Auger electrons, detecting nanoparticles using a microbalance, detecting charged species with a Faraday cup, detecting secondary electrons, detecting movement of analyte through defects, employing an analyte detector, evaluating the bubble point when submerged in a liquid, measuring the flux of gas or liquid at a given pressure differential, identifying a composition, mass, average radius, charge or size of an analyte; detecting electromagnetic radiation passing through defects; detecting electromagnetic radiation given off by analyte; and detecting electromagnetic radiation or particles back scattered from the membrane.

In any of the embodiments, the substrate may have a thickness less than or equal to 200 µm, or less than or equal to 150 µm, or less than or equal to 100 µm, or less than or equal to 75 µm, or less than or equal to 60 µm, or less than or equal to 50 µm. The thickness may be, for example, between 50 µm to 200 µm, or between 60 µm to 200 µm, or between 75 µm to 150 µm, or between 75 µm to 100 µm. In some embodiments the thickness may be 5 µm to 10 µm. In some embodiments the thickness may be 10 µm to 15 µm. In some embodiments the thickness may be 15 µm to 30 µm. In some embodiments, the thickness of the substrate varies. In some embodiments the thickness may vary by about 5%, about 10%, about 20%, about 30%, about 40%, about 50%, about 60%, about 70%, about 80%, about 90%, or about 100% of the average thickness of the substrate.

In an embodiment, the substrate may be substantially planar. In an embodiment, the substrate may be corrugated. In some embodiments, the plane that a flat substrate lies within defines an x, y plane; corrugated may intend that the positions of the first and second substrate faces may vary equally in the same directing along a z axis (orthogonal to the substrate or x, y plane), throughout different subsections of the substrate. In some embodiments wherein the substrate is corrugated, the substrate maintains the same thickness it would have if it were flat (lying uniformly within the x, y plane). In an embodiment, this variability along the z axis may impart three dimensional topography relative to a flat surface defined by the x, y plane.

In an embodiment, the first plurality of pores may include about $1\times10^5$ to $1\times10^{11}$ pores per cm$^2$ of substrate and the pores may have an average diameter between 10-10,000 nm. In an embodiment, the first plurality of pores may include about $1\times10^7$ to $1\times10^{10}$ pores per cm$^2$ of substrate and the pores may have an average diameter between 100-2,000 nm. In an embodiment, the first plurality of pores may include about $1\times10^5$ to $1\times10^8$ pores per cm$^2$ of substrate and the pores may have an average diameter between 2,000-10,000 nm.

In an embodiment, the first or second plurality of pores may each independently have an average diameter of about 10 nm to about 10,000 nm. In an embodiment, the first or second plurality of pores may each independently have an average diameter of about 100 nm to about 500 nm. In an embodiment, the first or second plurality of pores may each independently have an average diameter of about 500 nm to about 1,000 nm. In an embodiment, the first or second plurality of pores may each independently have an average diameter of about 1,000 nm to about 2,000 nm. In an embodiment, the first or second plurality of pores may each independently have an average diameter of about 2,000 nm to about 4,000 nm. In an embodiment, the first or second plurality of pores may each independently have an average diameter of about 4,000 nm to about 6,000 nm. In an embodiment, the first or second plurality of pores may each independently have an average diameter of about 6,000 nm to about 8,000 nm. In an embodiment, the first or second plurality of pores may each independently have an average diameter of about 8,000 nm to about 10,000 nm.

In an embodiment, the first or second plurality of pores may each independently include pores having an aspect ratio between 1:3,000 to 1:5. In an embodiment, the first or second plurality of pores may each independently include pores having an aspect ratio between 1:100 to 1:10. In an embodiment, the first or second plurality of pores may each independently include pores having an aspect ratio between 1:75 to 1:25.

In an embodiment, the first or second plurality of pores may be asymmetric through the substrate's thickness. In an embodiment, the first or second plurality of pores may each independently have pore diameters at the second face of the substrate that are 5-50% of their diameter at the first face of the substrate.

In an embodiment, the modified substrate may have bimodal porosity. In an embodiment, the modified substrate may further include a second plurality of pores through the substrate, wherein the second plurality of pores comprises pores having an average diameter of up to 50% the average diameter of the pores of the first plurality of pores and wherein the second plurality of pores is comprised of $1\times10^7$ to $1\times10^{13}$ pores per cm$^2$ of substrate.

In an embodiment, the substrate may have a porosity of 1% to 10%. In an embodiment, the substrate may have a porosity of 10% to 20%. In an embodiment, the substrate may have a porosity of 20% to 30%. In an embodiment, the substrate may have a porosity of 30% to 40%. In an embodiment, the substrate may have a porosity of 40% to 50%. In an embodiment, the substrate may have a porosity of 50% to 90%.

The size distribution of pores may be narrow, for example, limited to 0.1 to 0.5 coefficient of variation. In an embodiment, the characteristic dimension for specifying size of the pores may be selected for the application. For circular, elliptical, or cylindrical pores, the Characteristic dimension may be the diameter of the pores. For non-circular pores, the characteristic dimension "diameter" shall refer to the hydraulic diameter $D_H$, wherein $D_H=4A/P$, wherein A is the cross sectional area of the pore and P is the perimeter of the cross section.

In an embodiment, the size distribution of a plurality of pores may be narrow, for example, limited to a 1-10%±3% deviation in size, or a 1-20%±5% deviation in size, or a 1-30%±5% deviation in size. In an embodiment, the characteristic dimension of the pores may be selected for the application. For circular pores, the characteristic dimension may be the diameter of the pore or perforation. For non-circular pores, the characteristic dimension "diameter" shall refer to the hydraulic diameter $D_H$, wherein $D_H=4A/P$, wherein A is the cross sectional area of the pore and P is the perimeter of the cross section.

Quantitative image analysis of pore features may include measurement of the number, area, size and/or perimeter of pore features. In an embodiment, the equivalent diameter, d, of each pore may be calculated. from the equation. $A=\pi d^2/4$, wherein A is the area of a pore. When the pore area is plotted as a function of equivalent pore diameter, a pore size distribution may be obtained. The coefficient of variation of the pore size may be calculated herein as the ratio of the standard deviation of the pore size to the mean of the pore size.

In an embodiment, the substrate may include one or more pluralities of pores, such that the molecular weight cutoff (MWCO) for the substrate is selected from about 1 to 5 daltons, 5 to 50 daltons, 50 to 200 daltons, 200 to 500 daltons, 500 to 1,000 daltons, 1,000 to 5,000 daltons, 5,000 to 10,000 daltons, 10,000 to 50,000 daltons, or greater than 50,000 daltons. MWCO may be defined as the lowest molecular weight in daltons in which 90% of a solute of said molecular weight is retained from passage through the substrate. The solute may be in a solution including an aqueous solution or a biological aqueous solution.

In an embodiment, the ratio of the area, diameter, or width of the pores to the ratio of the area of the substrate face may be used to characterize the substrate. The area of the pores may be measured using quantitative image analysis. The area of the substrate face may be taken as the planar area spanned by the substrate face if it is desired to exclude the additional substrate surface area due to wrinkles or other non-planar features of the sheet. In a further embodiment, characterization may be based on the ratio of the area of the pores to the substrate face area excluding features including surface debris. In an embodiment, the pore area comprises 0.1% or greater, 1% or greater or 5% or greater of the substrate face area, less than 10% of the substrate face area, less than 15% of the substrate face area, from 0.1% to 15% of the substrate face area, from 1% to 15% of the substrate face area, from 5% to 15% of the substrate face area or from 1% to 10% of the substrate face area. In a further embodiment, the pores are located over greater than 10% or greater than 15%, or greater than 30%, or greater than 40%, or greater than 50%, or greater than 60%, or greater than 70%, or greater than 80%, or greater than 90% of the substrate face.

In an embodiment, the modified substrate may include a coating including a multi-dimensional material, a two-dimensional material, or multiple layers thereof. In an embodiment, the coating is disposed on the second face of the substrate. The two dimensional material may include graphene, graphene platelets, black phosphorous, hafnium dioxide, molybdenum disulfide, molybdenum diselenide, carbide, a carbon nanomembrane (CNM), an ultra-thin carbon membrane, an amorphous carbon membrane, carbon nanotubes (CNT), graphyne, borophene, germanene, silicone, Si$_2$BN, stanine, phosphorene, bismuthene, molybdenite, palladium, rhodium, Pb/Sn alloy, Pb/Bi alloy, aerographite, aerogel, nanogel, carbon nanofoam, amorphous carbon and hydrocarbons, hexagonal boron nitride, borocarbonitride, germanane, transition metal dichalcogenide, polymeric or metallic nanofibers, silicon nitride, silicon dioxide, silicon carbide, ultra-thin polymers or any combination thereof. In an embodiment, the two-dimensional material may include graphene. In an embodiment, the substrate may be chemically functionalized. In an embodiment, functionalization includes attachment to the substrate of peptides, nucleic acids, aptamers, other biological molecules, small molecules, polymers, or combinations thereof. In an embodiment, attachment may be non-covalent. In an embodiment, attachment may be covalent.

In an embodiment, the coating may have a thickness of less than 10 nm. In an embodiment, the coating may have a thickness of less than 100 nm. In an embodiment, the coating may have a thickness of less than 1,000 nm.

In an embodiment, the two-dimensional material may be a sheet of graphene-based material comprising a sheet of single or multilayer graphene or a combination thereof. In another embodiment, the sheet of graphene-based material may be a sheet comprising a plurality of interconnected single or multilayer graphene domains. In an embodiment, the interconnected domains are covalently bonded together to form the sheet. When the domains in a sheet differ in crystal lattice orientation, the sheet may be polycrystalline.

Other nanomaterials having an extended two-dimensional, planar molecular structure can also constitute the two-dimensional material in the various embodiments herein. For example, molybdenum disulfide is a representative chalcogenide having a two-dimensional molecular structure, and other various chalcogenides can constitute the two-dimensional material in the embodiments herein. Choice of a suitable two-dimensional material for an application can be determined by a number of factors, including the chemical, biological, and physical environment into which the graphene, graphene-based or other two-dimensional material is to be deployed.

Graphene-based materials include, but are not limited to, single-layer graphene, multilayer graphene, or interconnected single or multilayer graphene domains and combinations thereof. In an embodiment, graphene-based materials also include materials that have been formed by stacking single or multilayer graphene sheets. In an embodiment, multilayer graphene includes 2 to 20 layers, 2 to 10 layers, or 2 to 5 layers. In an embodiment, the stack of graphene sheets includes 2 sheets, 3 sheets, or more than 3 sheets. In an embodiment, graphene may be the dominant material in a graphene-based material. For example, a graphene-based material comprises at least 20% graphene, at least 30% graphene, at least 40% graphene, at least 50% graphene, at least 60% graphene, at least 70% graphene, at least 80% graphene, at least 90% graphene, or at least 95% graphene. In an embodiment, a graphene-based material comprises a range of graphene selected from 30% to 95%, from 40% to 80% from 50% to 70%, from 60% to 95% or from 75% to 100%.

In an embodiment, the two-dimensional material comprises a plurality of perforations therethrough. In an embodiment, the perforations have a diameter of up to 1 nm. In an embodiment, the perforations have a diameter of between 1 and 10 nm. In an embodiment, the perforations have a diameter of between 10 and 20 nm. In an embodiment, the perforations have a diameter of between 20 and 30 nm. In an embodiment, the perforations have a diameter of between 30 and 40 nm. In an embodiment, the perforations have a diameter of between 40 and 50 nm. In an embodiment, the perforations have a diameter of between 50 and 70 nm. In an embodiment, the perforations have a diameter of between 70 and 100 nm. In an embodiment, the perforations have a diameter of between 5 and 70 nm. In an embodiment, the perforations have a diameter of between 10 and 50 nm.

In an embodiment, the two-dimensional material comprises one or more pluralities of perforations therethrough. In an embodiment, each plurality of perforations may independently include perforations having a diameter of up to 1 nm. In an embodiment, each plurality of perforations may independently include perforations having a diameter of between 1 and 10 nm. In an embodiment, each plurality of perforations may independently include perforations having a diameter of between 10 and 20 nm. In an embodiment, each plurality of perforations may independently include perforations having a diameter of between 20 and 30 nm. In an embodiment, each plurality of perforations may independently include perforations having a diameter of between 30 and 40 nm. In an embodiment, each plurality of perforations may independently include perforations having a diameter of between 40 and 50 nm. In an embodiment, each plurality of perforations may independently include perforations having a diameter of between 50 and 70 nm. In an embodiment, each plurality of perforations may independently include perforations having a diameter of between 70 and 100 nm. In an embodiment, each plurality of perforations may independently include perforations having a diameter of between 5 and 70 nm. In an embodiment, each plurality of perforations may independently include perforations having a diameter of between 10 and 50 nm.

Substrates including more than one two-dimensional material coating may have variable perforations in each respective two-dimensional coating. For example, the one or more perforated two-dimensional materials may each independently have an average perforation size selected from a range of 1 nm to 100 nm, or 1 nm to 50 nm, or 1 nm to 20 nm, or 1 nm to 10 nm, or 1 nm to 5 nm. In an embodiment, perforations of the two-dimensional materials are chemically functionalized. In an embodiment, the two-dimensional material is chemically functionalized onto the face of substrate.

In an embodiment, pores through the substrate are aligned with the perforations of the two-dimensional material. This alignment can be used in increasing flow through the coated substrate. In an embodiment, the pores in the substrate are concentrically aligned with perforations in the two-dimensional material coated thereon.

Perforations may be sized to provide desired selective permeability of a species (atom, ion, molecule, DNA, RNA, protein, virus, cell, etc.) for a given application. Selective permeability relates to the propensity of a porous material, for example, a substrate, or a perforated two-dimensional material to allow passage (or transport) of one or more species faster than other species. Selective permeability allows separation of species that exhibit different passage or transport rates. In substrates and two-dimensional materials selective permeability correlates to the dimension or size (for example, diameter) of apertures or pores and the thickness of the substrate. Selective permeability of the perforations in two-dimensional materials including graphene-based materials can also depend on functionalization of perforations and membrane surfaces (if any) and the specific species that are to be separated. Selective permeability can also depend on a voltage applied across the substrate or membrane. Separation of two or more species in a mixture includes a change in the ratio(s) (weight or molar ratio) of the two or more species in the mixture after passage of the mixture through a perforated two-dimensional material. The separative properties of the substrate may be changed by coating with a two-dimensional material. Separative properties of the substrate may also be varied by stacking two or more two-dimensional materials with variable functionalization of each respective two-dimensional material.

In an embodiment, the two-dimensional material has a thickness less than or equal to 20 atomic layers, or less than or equal to 10 atomic layers, or less than or equal to 5 atomic layers, or less than or equal to 2 atomic layers.

In an embodiment, the thickness of the sheet of graphene-based material may be from 0.34 to 10 nm, from 0.34 to 5 nm, or from 0.34 to 3 nm. A sheet of graphene-based material may comprise intrinsic defects. Intrinsic defects are those resulting intentionally or unintentionally from preparation of the graphene-based material in contrast to perforations which are selectively introduced into a sheet of graphene-based material or a sheet of graphene. Such intrinsic defects include, but are not limited to, lattice anomalies, pores, tears, cracks or wrinkles. Lattice anomalies can include, but are not limited to, carbon rings with other than 6 members (for example 5, 7 or 9 membered rings), vacancies, interstitial defects (including incorporation of non-carbon atoms in the lattice), bonded side groups (for example, epoxide or other side groups), and grain boundaries.

In an embodiment, the layer comprising the sheet of graphene-based material further comprises non-graphenic carbon-based material located on the surface of the sheet of graphene-based material. In an embodiment, the non-graphemic carbon-based material does not possess long-range order and may be classified as amorphous. In an embodiment, the non-graphenic carbon-based material further comprises elements other than carbon and/or hydrocarbons. Non-carbon materials which may be incorporated in the non-graphenic carbon-based material include, but are not limited to, hydrogen, hydrocarbons, oxygen, silicon, copper, and iron. In an embodiment, carbon may be the dominant material in non-graphenic carbon-based material. For example, a non-graphenic carbon-based material comprises at least 30% carbon, or at least 40% carbon, or at least 50% carbon, or at least 60% carbon, or at least 70% carbon, or at least 80% carbon, or at least 90% carbon, or at least 95% carbon. In an embodiment, a non-graphenic carbon-based material comprises a range of carbon selected from 30% to 95%, or from 40% to 80%, or from 50% to 70%.

In an embodiment, the two-dimensional material is functionalized. Functionalization includes functionalization in the vicinity of perforations and/or functionalization on other portions of the two-dimensional material. In some embodiments, the functionalization is at the surface of the two-dimensional material. Functionalization of filter perforations in the two-dimension material can be accomplished by any means known in the art. Functionalization includes functionalization materials with attached carboxylate or related acidic or negatively charged chemical species or attached amine or related basic or positively charged chemical species. Additional functionalization can include functionalization with hydrophobic groups or functionalization with hydrophilic groups where various such groups are known in the art. Additional functionalization can include functionalization with polar groups or functionalization with non-polar groups where various such groups are known in the art. Additional functionalization includes borate, sulfate, sulfoxide, and organosilanes among others. Functionalization can include functionalization with organic polymers or biological polymers. Functionalization includes an attached protein receptor, a ligand, an antibody, or other chemical or biological species which selectively binds to one or more target entities. Functionalization includes functional groups attached via a linking species which spaces the functional group from the filter surface. Various linkers are known in the art and include hydrocarbon linkers, ether linkers, thio-ether linkers. For example a linker may contain a plurality of —$CH_2$— moieties in combination with one or more —O—, —S—, —CO—, —COO—, —NH—, —NH— CO—. Exemplary linkers can contain 2-50 carbon atoms and 2-20 heteroatoms selected from oxygen, nitrogen and sulfur.

In any of the embodiments, the substrate may comprise polysulfones, polyurethane, polymethylmethacrylate (PMMA), polyglycolid acid (PGA), polylactic acid (PLA), polyethylene glycol (PEG), polylactic-co-glycolic acid (PLGA), polyamides, polyimides, polypropylene, polyethersulfones (PES), polyvinylidine fluoride (PVDF), cellulose acetate, polyethylene, polyethylene terephthalate (PET), polypropylene, polycarbonate, polytetrafluoroethylene (PTFE), polyvinylchloride (PVC), polyether ether ketone (PEEK), polycaprolactone, polydimethylsiloxane (PDMS), block co-polymers of any of these, thin film polymers, ceramics and inorganic materials, silicon nitride, $SiO_2$, Si, $TiO_2$, thin metal films (for example, Ti, Au), track-etched polyimide, track etched polycarbonate, track etched PET and combinations or mixtures thereof.

In an embodiment, the substrate may include a combination or mixture of materials. In an embodiment, the substrate may include layers of different materials. In some embodiments the layers may not be distinct separate layers but may blend gradually at their interface. In some embodiments the entire thickness of the substrate may comprise a gradient with respect to any of the materials or layers of the substrate. In an embodiment, the substrate may be anisotropic.

In an embodiment, each substrate may include multiple substrate layers. The layers may be comprised of different substrate materials described herein. In an embodiment, each substrate layer may independently have a thickness of about 1 mm or less. In an embodiment, each substrate layer may independently have a thickness of about 100 nm to about 1 mm. In an embodiment, each substrate layer may independently have a thickness of about 1 μm to about 25 μm. In an embodiment, each substrate layer may independently have a porosity gradient throughout its thickness.

In some embodiments, the substrate may comprise two or more layers, wherein any of the two or more adjacent layers may comprise an intermediate laminate layer therebetween. Two adjacent layers may comprise a first layer and a second layer, wherein contact between the first and the second layer may occur through the intermediate laminate layer. In some embodiments, the intermediate laminate layer may comprise an adhesive, a screen, a mesh, a support, or combinations thereof. In some embodiments, the intermediate laminate layer comprises an adhesive.

In some embodiments, the substrate may comprise two or more layers. Two adjacent layers may comprise a first layer and a second layer, wherein contact between the first and the second layer occurs directly. In an embodiment, the contact comprises lamination of the first and second layer.

In an embodiment, the substrates may include an embedded carbon nanotube (CNT) and/or carbon nanowires (CNW). In an embodiment, the nanotube or nanowire may have a diameter of 5 μm or less. In an embodiment, each of the nanotube or nanowire may have a diameter of about 200 nm or less. In an embodiment, wherein the substrate is comprised of layers of different material, the nanotube or nanowire may be dispersed within each substrate layer or select substrate layers. In some further embodiments, at least one substrate layer may comprise 5 wt. % or less of nanotubes or nanowires. In an embodiment, there may be two or more substrate layers and a weight percentage of nanotubes or nanowires may not be the same for all of the substrate layers. In an embodiment, the nanotube or nanowire may comprise elemental metal. In an embodiment, the nanotube or nanowire may comprise gold, silver, platinum, palladium, chromium, copper, titanium, stainless steel, vanadium oxide, or any combination of two or more thereof. In an embodiment, there may be two or more substrate materials or layers and the nanotubes or nanowires within each substrate material or layer differ. In some embodiments, the substrates have integrated reinforcers. In some embodiments may include external reinforcement bars.

In some embodiments, the substrate may include a plurality of embedded CNTs and/or CNWs. In some embodiments, the CNTs and/or CNWs are substantially aligned with each other. In some embodiments, the CNTs and/or CNWs are not substantially aligned with each other. In some embodiments, the CNTs and/or CNWs have a random orientation throughout the substrate.

A modified substrate may include a coating to reduce the variation in its surface topography and the incidence of defects of a two-dimensional material disposed thereon can be reduced. By chemically treating a substrate with a $SiO_2$-forming agent, the surface topography variations can be lessened while still maintaining the porosity/open surface area. Not only can such an approach improve the surface roughness of a substrate to facilitate disposition of graphene, graphene-based or other two-dimensional materials thereon, but such surface coating with $SiO_2$ can further improve the structural stability of the substrate itself, thereby facilitating use in a large scale production environment. For example, porous anodic alumina (PAA) is a brittle material, and applying a surface coating of $SiO_2$ can reduce the substrate brittleness. Moreover, the coating process can selectively reduce pore diameters of the porous substrate without changing its base structure. The foregoing can also lead to less complex designs, more serviceable elements, and improved temperature and chemical sensitivity. That is, the coating processes may allow the pore size and chemistry to be adjusted to meet the needs of a desired end application without necessitating re-engineering of the substrate.

In an embodiment, at least a portion of the first face of the substrate, may include a coating. Coatings may be selected from hydrogels, electrospun nanofibers, or carbon nanostructures (include nanotubes and nanowires). For example, at least 5%, at least 20%, at least 50%, at least 65%, at least 80%, at least 90%, or at least 95% of the first face and/or the second face of the substrate may include the coating.

In an embodiment, the coating is a hydrogel that may fill wells on the first face of the substrate, partially or totally. In an embodiment, the coating may not span the wells. In an embodiment, the coating may span the wells (see FIG. 5, left).

In an embodiment, the coating has a surface roughness, measured as a height difference between connected peaks and valleys on a surface of the coating or between an average peak height and an average valley height of the surface of the coating, less than or equal to 1,000 µm, less than or equal to 500 µm, less than or equal to 100 µm, less than or equal to 10 µm, less than or equal to 1 less than or equal to 50 nm, less than or equal to 40 nm, less than or equal to 30 nm, less than or equal to 20 nm, or less than or equal to 10 nm. The skilled artisan would readily be able to determine the surface roughness through methods not limited to atomic force microscopy, optical profilometry, surface profilometry, and scanning electron microscopy.

In an embodiment, the coating may have a thickness of less than 10 nm. In an embodiment, the coating may have a thickness of less than 100 nm. In an embodiment, the coating may have a thickness of less than 1,000 nm.

In an embodiment, a process for modifying a track-etched substrate is provided that may include providing a track-etched substrate including a first face and an opposite facing second face a distance from each other defining a thickness, wherein the track-etched substrate may include a first plurality of pores through the substrate; and producing a well in a first face of the substrate. The well may include a bottom surface that may be 1 to 10 µm from the second face of the substrate. In an embodiment, the process may further include bombarding the substrate with energetic particles and subsequently track-etching the substrate, to produce a second plurality of pores. In an embodiment, the second plurality of pores is only through the bottom surface of the well to the second face, but not through the full thickness of the substrate. In an embodiment, the second plurality of pores is through the full thickness of the substrate.

In an embodiment, a process for modifying a substrate is provided comprising: providing a non-track etched substrate including a well in a first face. The substrate may include the first face and an opposite facing second face at a distance from each other defining a thickness. The well may include a bottom surface that may be 1 to 10 µm from the second face of the substrate. The process may further include bombarding the substrate with energetic particles to produce a plurality of damage tracks through the substrate; and etching the substrate to produce a first plurality of pores through the substrate.

In an embodiment, providing a non-track etched substrate including a well in a first face may include providing a non-track etched substrate and producing a well in the first face by laser milling, photolithography, etching, texturing or imprinting the substrate.

In an embodiment, wells may be produced by texturing. In an embodiment, texturing may imprint a shape, pattern onto either face of a substrate. Texturing may be accomplished by placing a face of the substrate against a die or mold and applying pressure to the substrate and/or the die or mold. The die or mold may comprise any number of shapes on its surface and may transfer an imprint of this shape onto the face of the substrate. Non-limiting examples of shapes include a sphere, cube, cylinder, cone, tetrahedron, helix, pyramid including triangular pyramid and square pyramid, cone, torus, octahedron, ellipse, prism or any portion of each thereof or any combination of each thereof, in any size or orientation with respect to the substrate.

In some embodiments, the substrate may be corrugated. In some embodiments, the substrate may be bombarded to produce damage tracks, then corrugated, then track-etched. In some embodiments, the substrate may corrugated, then bombarded to produce damage tracks, then track-etched. In some embodiments, the substrate may bombarded to produce damage tracks, then track-etched, then corrugated.

In an embodiment, providing a non-track etched substrate including a well in a first face may include casting a solid substrate in a mold from liquid substrate material. In an embodiment, casting may include depositing a polymer solution (optionally with nanotubes or nanowires dispersed within the solution) onto a wafer, mold, cast, or surface using a method. including spin-coating, spray coating, curtain coating, doctor-blading, immersion coating, electrospinning (described, for example, in US 2009/0020921 and/or U.S. application Ser. No. 14/609,325, both of which are hereby incorporated by reference in their entirety), chemical vapor deposition or other similar techniques. Casting may be used to form various textures, wells of various shapes, and topographies at the substrate surface. In an embodiment, casting a substrate may comprise pouring a liquid comprising a polymer, non-limiting examples include polyimide, poly (methyl methacrylate) (PMMA), thin film polymers, polycarbonate, PET, nanowires, nanotubes, embedded supports, a mesh, and combinations thereof; into a mold, which may be a silicon wafer, which may contain a hollow cavity of a specific shape, and allowing the liquid to solidify according to the shape. The shape may comprise all or part of a sphere, cube, cylinder, cone, tetrahedron, helix, pyramid including triangular pyramid and square pyramid, cone, torus, octahedron, ellipse, prism, or combinations thereof. The liquid may be solidified by freezing, irradiating, reacting with other agents, or mixing with other agents.

In an embodiment, casting may include dual casting. Two or more different polymers or liquids may be cast onto the mold layer by layer, so as to form a substrate having more than one layer. In an embodiment, the mold only textures one layer of the substrate. In an embodiment, the mold textures two or more layers of the substrate. In some embodiments the layers may not be distinct separate layers but may blend gradually at their interface. In some embodiments the entire thickness of the substrate may comprise a gradient with respect to any of the components or layers of the substrate. In an embodiment, the substrate layers may be anisotropic.

In an embodiment, the process may further include bombarding the substrate with energetic particles a second time and subsequently track-etching the substrate a second time, to produce a second plurality of pores. In an embodiment, the second plurality of pores is only through the bottom. surface of the well to the second face, but not through the full thickness of the substrate. In some embodiments, the second plurality of pores is through the thickness of the substrate.

In an embodiment, the well may be from 1 to 1,500 µm in diameter. In an embodiment, the well may be from 1 to 1,000 µm in diameter. In an embodiment, the well may be from 1 to 200 µm in diameter. In an embodiment, the well may be from 200 to 400 µm in diameter. In an embodiment, the well may be from 400 to 600 µm in diameter. In an embodiment, the well may be from 600 to 800 µm in diameter. In an embodiment, the well may be from 800 to 1,000 µm in diameter.

in an embodiment, the bottom surface of the well may be from 1 to 10 µm from the second face of the substrate. In an embodiment, the bottom surface may be from 1 to 3 µm from the second face of the substrate. In an embodiment, the bottom surface may be from 3 to 6 µm from the second face of the substrate. In an embodiment, the bottom surface may be from 6 to 9 µm from the second face of the substrate. In an embodiment, the bottom surface may be from 9 to 10 µm from the second face of the substrate.

In an embodiment, a plurality of wells is produced. In an embodiment, the wells are cylindrical, cubic, conic, tetrahedral, helical, pyramidal, a torus, octahedral, or any combination thereof, present in any size or orientation within the thickness of the substrate. In an embodiment, the modified substrates may include a plurality of wells interconnected by channels. In some embodiments the width of the channel is equal to the diameter or width of a well.

in an embodiment, the wells produced are horizontally and vertically aligned (FIG. 6A). In an embodiment, the wells produced may have an offset arrangement (FIG. 6B). Referring to FIGS. 6A and 6B, distances between adjacent wells, $d_1$ and $d_2$, may each independently be selected from between 5 to 1,000 µm.

In an embodiment, a process for modifying a track-etched substrate may include: providing a track-etched substrate including a first face and an opposite facing second face at a distance from each other defining a thickness, wherein the track-etched substrate may include a first plurality of pores through the substrate; ion-bombarding the substrate to produce a plurality of damage tracks; and track-etching the substrate to produce a second plurality of pores. The first plurality of pores may include about $1 \times 10^5$ to $1 \times 10^{11}$ pores per $cm^2$ of substrate and pores having an average diameter between 10-10,000 nm, and the second plurality of pores may include pores having an average diameter of up to 50% the average diameter of the pores of the first plurality of pores, and the second plurality of pores may include of $1 \times 10^7$ to $1 \times 10^{13}$ pores per $cm^2$ of substrate.

In any embodiment, any of the processes herein produce a modified substrate described herein.

In an embodiment, the process further comprises thinning the substrate. Thinning may be performed before or after well production. In an embodiment, thinning reduces the thickness of the substrate between 1% and 10%. In an embodiment, thinning reduces the thickness of the substrate between 10% and 20%. In an embodiment, thinning reduces the thickness of the substrate between 20% and 30%. In an embodiment, thinning reduces the thickness of the substrate between 30% and 40%. In an embodiment, thinning reduces the thickness of the substrate between 40% and 50%. In an embodiment, thinning reduces the thickness of the substrate between 50% and 60%. In an embodiment, thinning reduces the thickness of the substrate between 60% and 80%. In an embodiment, thinning reduces the thickness of the substrate between 80% and 95%. Thinning may be accomplished chemically, mechanically, by plasma, ion beam, laser ablation, reactive ion etching (RIE) or thermally.

In an embodiment, the process herein may include a step of texturing, plasma treating, laser milling, photolithographing, thinning track-etching, or combinations thereof at only the first face or the second face, while the opposite face may not undergo the texturing, plasma treating, laser milling, photolithographing, thinning, track-etching, or combinations thereof. The face not undergoing the texturing, plasma treating, laser milling, photolithographing, thinning or track-etching may be masked or blocked with an etch-stop.

In an embodiment, the process may comprise coating the substrate on the second face with a first two-dimensional material and optionally coating the substrate on the first face with a second two-dimensional material. In some embodiments only the second face of the substrate is coated with a two-dimensional material. In an embodiment, only the first face of the substrate is coated with a two-dimensional material. In an embodiment, wherein only one face is coated, the face coated with a two-dimensional material may have a lesser porosity than the opposite face. In an embodiment, the only face coated has 0.5 to 2 µm spans. In an embodiment, the two-dimensional materials may be selected from those disclosed herein. Coating of the substrate with a two-dimensional material may be before or after track-etching of the substrate. In an embodiment, wherein coating with a two-dimensional material is only on the second face of the substrate, the first face may be coated, for example with hydrogel or electrospun nanofibers, laminated or plasma treated.

In an embodiment, the process may comprise bombarding the substrate with energetic particles to produce a plurality of damage tracks through the substrate. The particles may be in the form of electrons, ions, neutrons, and/or ion clusters. In an embodiment, the energetic particles are charged particles including protons or ions of He, Ne, Ar, Kr, Xe, C, Si, Ta, Ga, or other heavy ions. When a high velocity ion passes through the substrate, the ion may break chemical bonds in the substrate along its path to create a track or damage track.

In an embodiment, production of a plurality of damage tracks is followed by track-etching to produce a plurality of pores. The pores may create a passage through the thickness of the substrate. The pores may be randomly interspersed throughout the substrate.

Skilled artisans will appreciate that various factors can be used in the selection of the energetic particles and the bombardment step so as to directly affect the width, depth and orientation in the substrate of a track. These factors include but are not limited to residence time that the energetic particles are bombarded onto the substrate, the types of energetic particles or materials selected for the energetic particles, and other factors including particle flux. In further embodiments, the energy of the energetic particles may be 0.1 MeV-10,000 MeV, 0.1 MeV-5,000 MeV, 0.1 MeV-1,000 MeV, 0.1 MeV-100 MeV, 100 MeV-5,000 MeV or 1,000 MeV to 5,000 MeV. In some embodiments tracking may be accomplished by bombardment of the substrate with a fluence of $10^6$ ions/cm$^2$ to $10^{13}$ ions/cm$^2$. In some embodiments tracking may be accomplished by bombardment of the substrate with a fluence of $10^6$ ions/cm$^2$ to $10^9$ ions/cm$^2$. In some embodiments tracking may be accomplished by bombardment of the substrate with a fluence of about $10^8$ ions/cm$^2$. In an embodiment, residence time may be less than 1 second, less than 0.75 seconds, less than 0.5 seconds, less than 0.25 seconds, less than 0.1 seconds, less than 50 ms, less than 25 ms, less than 10 ms, or less than 5 ms.

Formation of damage tracks, bombardment with ions or energetic particles, and/or etching may be accomplished by the methods of U.S. Pat. No. 9,505,192, or U.S. patent application Ser. No. 15/099,588 the entire disclosures each of which are incorporated herein by reference.

In an embodiment, the energetic particle or ion bombardment of the substrate may be performed at an angle of incidence selected from 1°-10°, 10°-20°, 20°-30°, 30°-40°, 40°-50°, 50°-60°, 60°-70°, 70°-89°, or <90° with respect to the average plane of the face of the substrate upon which ion bombardment is incident upon, wherein the average plane defines an x, y plane and a 90° angle of incidence indicates bombardment normal to the x, y plane, and wherein the bombardment may be at an angle from a plane orthogonal to the x, y plane selected from 0.1°-10°, 10°-20°, 20°-30°, 30°-40°, 40°-50°, 50°-60°, 60°-70°, 70°-90°, 90-100, 100°-110°, 110°-120°, 120°-130°, 130°-140°, 140°-150°, 150°-160°, 160°-170°, 170°-190°, 190-200, 200°-210°, 210°-220°, 220°-230°, 230°-240°, 240°-250°, 250°-260°, 260°-270°, 270°-290°, 290-300, 300°-310°, 310°-320°, 320°-330°, 330°-340°, 340°-350°, or 350°-359.9°. In some embodiments the angle of incidence is random. In some embodiments the angle of incidence, particles being used, or fluence is varied throughout bombardment.

In an embodiment, bombardment may include bombardment with two different sets of particles, each having incident angles that may be independently selected from a value of 1°-10°, 10°-20°, 20°-30°, 30°-40°, 40°-50°, 50°-60°, 60°-70°, or 80°-89°, or <90° with respect to the average plane of the face of the substrate upon which ion bombardment is incident upon, wherein the average plane defines an x, y plane and a 90° angle of incidence indicates bombardment normal to the x, y plane and wherein the bombardment of each of the different sets of particles may independently be at an angle from a plane orthogonal to the x, y plane selected from 0.1°-10°, 10°-20°, 20°-30°, 30°-40°, 40°-50°, 50°-60°, 60°-70°, 70°-90°, 90-100, 100°-110°, 110°-120°, 120°-130°, 130°-140°, 140°-150°, 150°-160°, 160°-170°, 170°-190°, 190-200, 200°-210°, 210°-220°, 220°-230°, 230°-240°, 240°-250°, 250°-260°, 260°-270°, 270°-290°, 290-300, 300°-310°, 310°-320°, 320°-330°, 330°-340°, 340°-350°, or 350°-359.9°.

In an embodiment, bombardment may include bombardment with more than two different sets of particles, each having incident angles that may be independently selected from a value of 1°-10°, 10°-20°, 20°-30°, 30°-40°, 40°-50°, 50°-60°, 60°-70°, 80°-89°, or <90° with respect to the average plane of the face of the substrate upon which ion bombardment is incident upon, wherein the average plane defines an x, y plane and a 90° angle of incidence indicates bombardment normal to the x, y plane, and wherein the bombardment of each of the two or more sets of particles may independently be at an angle from a plane orthogonal to the x, y plane selected from 0.1°-10°, 10°-20°, 20°-30°, 30°-40°, 40°-50°, 50°-60°, 60°-70°, 70°-90°, 90-100, 100°-110°, 110°-120°, 120°-130°, 130°-140°, 140°-150°, 150°-160°, 160°-170°, 170°-190°, 190-200, 200°-210°, 210°-220°, 220°-230°, 230°-240°, 240°-250°, 250°-260°, 260°-270°, 270°-290°, 290-300, 300°-310°, 310°-320°, 320°-330°, 330°-340°, 340°-350°, or 350°-359.9°.

In an embodiment, the process may comprise selecting energetic particles for bombardment so as to form the plurality of pores through substrate so that the substrate may be chemically functionalized. In an embodiment, the energetic particles for bombardment may be selected so as to leave the substrate inert toward pore enlargement.

In an embodiment, the energetic particles during ion bombardment are screened by a porous template material (i.e. a shadow mask) before impacting either the substrate. In an embodiment, the screen or mask limits bombardment of the substrate to select regions, thereby limiting the extent of pore formation in the substrate. Limiting pore formation in the substrate to select regions can limit reduction permeability or strengthen the substrate.

In an embodiment, wells may be formed by laser milling or photolithography. In an embodiment, block copolymers may be used as a template or mask for the laser milling or photolithography. In an embodiment, femtosecond lasers may be used to accomplish laser milling.

In an embodiment, a well is produced by lithography. Lithographic methods include, but are not limited to, soft-lithography, optical lithography, electron beam lithography, rolling mask lithography, imprint lithography, and extreme UV lithography. In some embodiments photolithographing comprises masking. Suitable masks may comprise photoresist, diamond, beryllium, silicon, or silicon carbide. The mask may be textured, patterned or contain apertures, In an embodiment, etching may include contacting the substrate with an etchant. In some embodiments the etchant may be a liquid. In some embodiments the etchant may be a gas. In some embodiments, the etching is dry etching. In some embodiments, the etching is wet etching. In some embodiments, the etching is anisotropic etching. In some embodiments, the etching is isotropic etching. In some embodiments, the etching is sputter etching. In some embodiment the etchant may comprise potassium hydroxide (KOH), sodium hydroxide (NaOH), sodium hypochlorite (NaClO), hydrogen fluoride (HF), oxidants, for example, ozone, potassium permanganate, sulfuric acid and combinations thereof and modified Hummer's solution. In an embodiment, the oxidant combines $NaNO_3$, $H_2SO_4$ and $KMnO_4$. Other strong oxidants may also be suitable and will be recognized by one having ordinary skill in the art.

In an embodiment, the etching may be reactive ion etching, anisotropic etching, plasma etching, V-groove etching, ion-bombardment or irradiation, etching with ethylene diamine, etching with Keller's reagent, etching with HCl or etching with nitric acid. In an embodiment, the etching may be atmospheric dry etching.

In an embodiment, the etching may be UV-ozone etching and may include exposure of the substrate to atomic oxygen. Suitable wavelengths of UV light include, but are not limited to wavelengths below 300 nm or from 150 nm to 300 nm. In an embodiment, the intensity may be from 10 to 100 mW/cm$^2$ at 6 mm distance or 100 to 1,000 mW/cm$^2$ at 6 mm distance. For example, suitable light may be emitted by mercury discharge lamps (for example about 185 nm and 254 nm). In an embodiment, UV/ozone etching may be performed at room temperature or at a temperature greater than room temperature. In further embodiments, UV/ozone etching may be performed at atmospheric pressure (for example 1 atm) or under vacuum.

In an embodiment, the etching may be at −78 to −60° C. In an embodiment, the etching may be at −60 to −40° C. In an embodiment, the etching may be at −40 to −20° C. In an embodiment, the etching may be at −20 to 0° C. In an embodiment, the etching may be at 0 to 20° C. In an embodiment, the etching may be at 20 to 40° C. In an embodiment, the etching may be at 40 to 60° C. In an embodiment, the etching may be at 60 to 80° C. In an embodiment, the etching may be at 80 to 100° C. In an embodiment, the etching may be at 100 to 120° C. In an embodiment, the etching may be at 120 to 140° C. In an embodiment, the etching may be at 140 to 160° C. In an embodiment, the etching may be at 160 to 180° C. In an embodiment, the etching may be at greater than 180° C.

In an embodiment, etching may be performed in more than one step. For example, "etching" or "etched" may refer to a process comprising an etching step configured so that the substrate may not be completely etched through its thickness.

In some embodiments the etching step may be done to a substrate that has been coated as described herein. In an embodiment, only the first or only the second face of the substrate is etched. An etch stop may be used to prevent etching at either face. A conical or frustoconical pore shape may be produced. The substrate may also be exposed to ultraviolet light following bombardment. If bombardment of the substrate provides a damage pit rather than a damage track this pit can be used as an initiating point for etching.

In an embodiment, etching may comprise applying etchant to a layer of two-dimensional material, wherein a substrate is coated with the two-dimensional material. In an embodiment, etchant may be applied to the two-dimensional material before being applied to the substrate, after being applied to the substrate, or at the same time as being applied to the substrate. In an embodiment, the etchant applied to the two-dimensional material may be different etchant as that applied to the substrate. In an embodiment, etching occurs on both a first and second face of the substrate. In an embodiment, wherein etching occurs on both a first and second face of a substrate coated with two-dimensional material, flow of etchant through a perforation in the two-dimensional material may be restricted by the perforation's size in the two-dimensional material.

In an embodiment, etching may comprise contacting the substrate with a gas or liquid etchant to form a plurality of pores through the substrate. In an embodiment, etching may comprise contacting the substrate with etchant for less than 1 minute. In an embodiment, etching may comprise contacting the substrate with etchant for 1 to 20 minutes. In an embodiment, etching may comprise contacting the substrate with etchant for less than 1 minute. In an embodiment, etching may comprise contacting the substrate with etchant for 1 to 3 minutes. In an embodiment, etching may comprise contacting the substrate with etchant for 3 to 9 minutes. In an embodiment, etching may comprise contacting the substrate with etchant for 9 to 12 minutes. In an embodiment, etching may comprise contacting the substrate with etchant for 12 to 15 minutes. In an embodiment, etching may comprise contacting the substrate with etchant for 15 to 18 minutes. In an embodiment, the etching may comprise contacting the substrate with etchant for greater than 18 minutes. In an embodiment, the etching may comprise contacting the substrate with etchant for greater than 40 minutes.

In an embodiment, etching may be carried out on a first face of a substrate that includes wells therein, to form a plurality of pores. The pore size at the first face after such etching tends to be larger than at the second face that is not etched and a conical or frustoconical pore shape may be produced at the first face having the wider portion the pore adjacent thereto. The substrate may also be exposed to ultraviolet light following bombardment. If irradiation of the substrate with ultraviolent light produces a damage pit rather than a damage track, this pit can be used as an initiating point for etching.

In an embodiment, the process may include producing a well in the first face of the substrate, bombardment, coating the second face of the substrate with a two-dimensional, then track etching the substrate. In an embodiment, the process may comprise producing a well in the first face of the substrate, bombardment, then track etching the substrate, then coating the second face of the substrate with a two-dimensional material.

In an embodiment, the process further comprises coating the second face of the substrate. In an embodiment, coating the second face of the substrate may include coating with a electrospun nanofibers, a multi-dimensional material, or a two-dimensional material or multiple layers thereof selected from the group consisting of graphene, black phosphorous, hafnium dioxide, molybdenum disulfide, molybdenum diselenide, carbide, a carbon nanomembrane (CNM), an ultrathin carbon membrane, an amorphous carbon membrane, a carbon nanotube (CNT), graphyne, borophene, germanene, silicone, silicone, Si$_2$BN, stanine, phosphorene, bismuthene, molybdenite, palladium, rhodium, Pb/Sn alloy, Pb/Bi alloy, aerographite, aerogel, nanogel, carbon nanofoam, graphene, hexagonal boron nitride, borocarbonitride, germanane, a transition metal dichalcogenide or a combination thereof. Alternatively or additionally, the substrate may be coated at the first face with one or more of a hydrogel, electrospun nanofibers or a two-dimensional material or multiple layers thereof selected from the group consisting of graphene, black phosphorous, hafnium dioxide, molybdenum disulfide, molybdenum diselenide, carbide, a carbon nanomembrane (CNM), a carbon nanotube (CNT), graphyne, borophene, germanene, silicone, silicone, Si$_2$BN, stanine, phosphorene, bismuthene, molybdenite, palladium, rhodium, Pb/Sn alloy, Pb/Bi alloy, aerographite, aerogel, nanogel, carbon nanofoam, graphene, hexagonal boron nitride, borocarbonitride, germanane, a transition metal dichalcogenide, silicon nitride, silicon dioxide, silicon carbide, ultrathin polymers, or combinations thereof. Coating may comprise depositing a two-dimensional material onto the substrate via chemical vapor deposition (CVD), or direct ink writing. In an embodiment, the two-dimensional material may be chemically functionalized. In an embodiment, the two-dimensional material may be chemically functionalized at its outer surface.

In an embodiment, the coating may have a thickness of less than 10 nm. In an embodiment, the coating may have a thickness of less than 100 nm. In an embodiment, the coating may have a thickness of less than 1,000 nm.

In an embodiment, coating the substrate may include chemically bonding the two-dimensional material to the substrate. In an embodiment, the chemical bonding is accomplished via irradiation.

The technique used for forming the graphene or graphene-based material is not believed to be particularly limited, and may be used to form single-layer graphene or graphene-based materials (SLG) or few-layer graphene or graphene-based materials (FLG). For example, in an embodiment, chemical vapor deposition (CVD) graphene or graphene-based material can be used. In various embodiments, the CVD graphene or graphene-based material can be liberated from a growth substrate (for example, Cu) and transferred to a substrate. Likewise, the techniques for introducing perforations to the graphene or graphene-based material are also not believed to be particularly limited, other than being chosen to produce perforations within a desired size range. Suitable techniques are described, for example, in U.S. Patent Pub. Nos. 2013/0249147, 2014/0272286, 2015/0221474 and 2015/0221474, each of which is incorporated by reference herein in its entirety.

In an embodiment, the process may further include coating the second face of the substrate with a first layer of a two dimensional material disclosed herein and optionally coating and/or plasma treating the first face of the substrate. The first face of the substrate may be plasma treated and/or coated with a material selected from a hydrogel, electrospun nanofibers, graphene, graphene oxide, carbon nanotubes, or carbon nanomaterials. In an embodiment, the coating reduces roughness.

Figure 5:
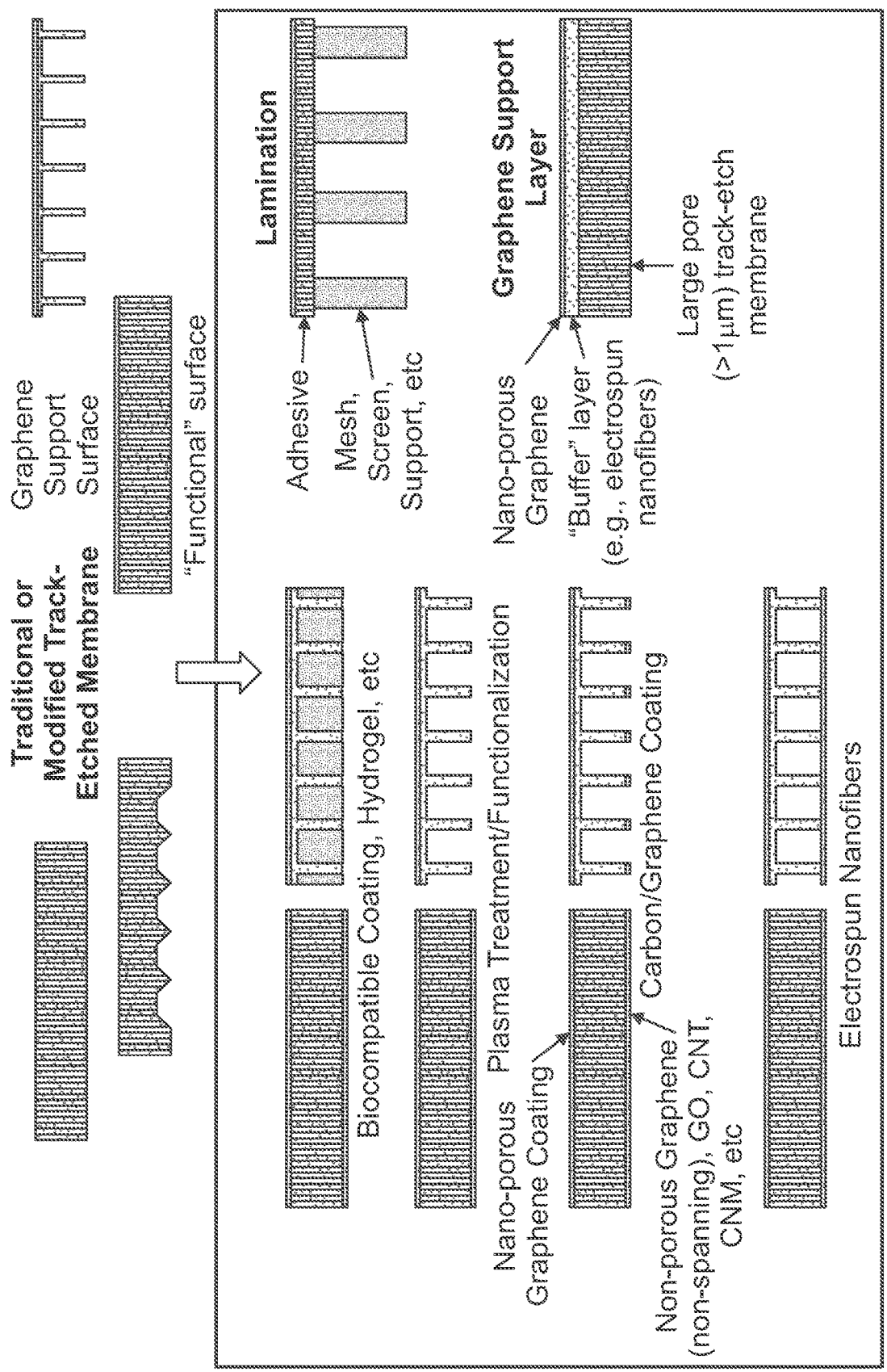
FIG. 5 illustrates some of the surface modifications of FIG. 1 in accordance with some embodiments, for example, coating, plasma treatment, lamination, use of an intermediate layer, or addition of electrospun nanofibers.

In an embodiment, an intermediate layer that may include electrospun nanofibers may be disposed on a face of the substrate, before coating the face with a two-dimensional material (FIG. 5). In an embodiment, coating a substrate with a two-dimensional material and using an intermediate layer may include the step of disposing a two-dimensional material on the intermediate layer which may include transferring the two-dimensional material using a sacrificial substrate. In another embodiment, the step of disposing a two-dimensional material on the intermediate layer may include floating the two-dimensional material onto the coating while the substrate and coating are submerged in a fluid. In yet another embodiment, the step of disposing a two-dimensional material on the intermediate layer may include dry contact transfer.

In an embodiment, the process may further include a step of perforating the two-dimensional material prior to coating the substrate with the two-dimensional material. In an embodiment, the process may further include a step of perforating the two-dimensional material after to coating the substrate with the two-dimensional material. Perforating a two-dimensional material may include bombardment with energetic particles or ions.

In some embodiments, the characteristic size or dimension of the perforations is from 0.3 to 10 nm, from 1 to 10 nm, from 5 to 10 nm, from 5 to 20 nm, from 5 to 25 nm, from 7 to 25 nm, from 7 to 20 nm, from 10 to 25 nm, from 15 to 25 nm, from 10 to 50 nm, from 50 to 100 nm, from 50 to 150 nm, from 100 to 200 nm, or from 100 to 500 nm. In some embodiments, the average pore size is within the specified range. In some embodiments, 70% to 99%, 80% to 99%, 85% to 99%, or 90% to 99% of the perforations in a sheet or layer fall within a specified range, but other pores fall outside the specified range. Additionally, in various embodiments, the size distribution of holes may be narrow, e.g., limited to a 1-10%±3% deviation in size, or a 1-20%±5% deviation in size, or a 1-30%±5% deviation in size.

Various techniques may be used to introduce perforations to graphene, a graphene-based material, or other two-dimensional material. Chemical techniques can be used to create perforations in graphene, graphene-based materials, and other two-dimensional materials. For example, exposure of graphene, a graphene-based material, or another two-dimensional material to ozone or atmospheric pressure plasma (e.g., an oxygen/argon or nitrogen/argon plasma) can create perforations. As another example, the exposure of graphene, a graphene-based material, or another two-dimensional material to an ion beam from a cyclotron and later to a caustic etchant (e.g., through a track etching process) can create perforations. Physical techniques, including focused ion beam drilling, ion bombardment, nanoparticle bombardment, cluster bombardment, and lithographic techniques can also be used to remove matter from the planar structure of two-dimensional materials in order to create holes, perforations, or pores. Additionally, combinations of physical and chemical techniques may be used to create perforations in graphene, a graphene-based material, or other two-dimensional material. All such physical or chemical methods can be applied for preparation of perforated or porous two-dimensional materials for use herein, dependent upon the hole sizes or range of hole sizes desired for a given application.

As noted above, the techniques for introducing perforations to the graphene or graphene-based material may be selected and/or varied to create perforations within a desired size range. Suitable techniques are described, for example, in U.S. Pat. No. 9,567,224, filed Mar. 12, 2013; U.S. Pat. No. 9,505,192, filed Mar. 7, 2014; and U.S. Pat. No. 9,870,895, filed Jan. 30, 2015, each of which is incorporated by reference herein in its entirety.

In an embodiment, the coating may be applied by dipping, spraying, sputtering, gas depositing or vapor depositing a coating material on the substrate.

In an embodiment, the process may include coating the first face of the substrate with a material selected from the group consisting of $SiO_2$, $TiO_2$, graphene oxide, a hydrogel, carbon nanotubes, carbon nanomaterials, electrospun nanofibers and combinations thereof. In an embodiment, the coating may be $SiO_2$. In an embodiment, the coating may be $TiO_2$. In an embodiment, the coating comprises a metal oxide, including a transition metal oxide or aluminum oxide. In an embodiment, the substrate and the coating are different materials and have different chemical compositions. In an embodiment, the coating may be a conformal coating. In an embodiment, the substrate may be coated with carbon nanotubes (CNTs) or other carbon nano materials. In some embodiments the coating may be a biocompatible coating, for example, hydrogel.

In an embodiment, the coating may have a thickness less than or equal to 100 nm, or less than or equal to 50 nm, or less than or equal to 35 nm, less than or equal to 20 nm, or less than or equal to 15 nm, or less than or equal to 10 nm, or less than or equal to 5 nm. For example, the coating may have a thickness between 5 nm to 100 nm, or between 5 nm to 50 nm, or between 5 nm to 35 nm, or between 5 nm to 20 nm, or between 5 nm to 15 nm, or between 5 nm to 10 nm. In an embodiment, the coating may have a thickness of less than 10 nm. In an embodiment, the coating may have a thickness of less than 100 nm. In an embodiment, the coating may have a thickness of less than 1,000 nm.

In an embodiment, the coating may be disposed on at least a portion of the first face of the substrate, at least a portion of the second face of the substrate or at least a portion of both the first face and the second face of the substrate. For example, at least 5%, at least 20%, at least 50%, at least 65%, at least 80%, at least 90%, or at least 95% of the first face and/or the second face of the substrate may be covered by the coating. In an embodiment, a majority of the first face of the substrate may be covered by the coating.

In an embodiment, wells are produced and the substrate optionally track-etched before coating. In an embodiment, the coating may fill wells on the first face of the substrate, partially or totally. In an embodiment, the coating may not span the wells. In an embodiment, the coating may span the wells (see FIG. 5, left).

In an embodiment, coating may include disposing a first intermediate layer between the substrate and the coating. For example, the first intermediate layer may be an adhesive layer, an oxide layer, a dielectric layer, a thermally insulating layer, a passivation layer, or a bonding layer.

The coating technique may not be particularly limited and can include such techniques as gas phase deposition, solution coating, sol-gel processes, and the like. In embodiments, deposition of a $SiO_2$ coating can be achieved through various adsorption, hydrolysis and washing processes, more specifically, deposition of a $SiO_2$ coating can lie achieved by contact of the surface with a $SiO_2$ precursor, a silicon-containing precursor, including a silicon halide or an organosilane or silicate, followed by hydrolysis to complete formation of the $SiO_2$. In an embodiment, a similar process can be employed using a $TiO_2$ precursor, including titanium tetrachloride or titanium alkoxides. Thereafter, drying of the coated substrate can take place, including in a stream of argon or nitrogen. As needed, the deposition operations can be repeated one or more times to build up or thicken the surface and pore walls to ensure adequate coverage with a more uniform surface topography. The coated substrate can then be cycled through a heating process that heat treats or anneals the coating material to further increase its strength. In illustrative embodiments, the thickness of the coating may be about 10 µm, or about 5 µm, or about 2 µm, or between 10 µm and 2 µm. In specific embodiments, sol-gel processes can be employed to prepare $SiO_2$ or $TiO_2$ coatings.

Substrates of various thicknesses, layers, and-coatings may be formed as described herein to produce membranes having defined properties such as rigidity and ability to act as a mechanical support. These properties may determine the biological activity or biocompatibility of the product membranes. In some embodiments, the surface topography of the substrate is configured to modulate the immune response and improve biocompatibility. In some embodiments, the surface topography of the substrate is configured to prevent aggregation of macrophages at the substrate.

Some embodiments may comprise enclosures or barriers formed from substrates described herein wherein the substrate enclosures contain cells, pharmaceuticals, proteins therapeutic agents, and other medicaments. In some embodiments, the substrate enclosures allow the passage of oxygen, nutrients, and other molecules while preventing or regulating the passage of cells, proteins, pharmaceuticals, therapeutic agents, medicaments, and other selected molecules through the substrate. In some embodiments, the first face of the substrate forms the outside of the enclosure or encapsulation. In some embodiments, substrates may be employed as are immunomodulatory membrane. In some embodiments, substrates may be configured for microencapsulation or macroencapsulation of xenogeneic or allogenic cells for long-term in vivo implantation. In an embodiment, the substrate enclosure may be configured to encapsulate pancreatic islets for use in a bioartificial pancreas or as a therapeutic treatment of Type 1 diabetes. For example, a substrate enclosure may be loaded with viable allogenic, xenogenic, autogenic, or de novo insulin-producing Islets of Langerhans or β-cells suspended in a suitable cell media and then sealed and implanted into a recipient, patient or subject. The substrate may provide a physical barrier between the implanted Islets of Langerhans or β-cells and the recipient, patient or subject, thereby shielding the Islets of Langerhans or β-cells from the immune system while allowing sufficient transport of necessary nutrients, glucose, and insulin for the Islets of Langerhans or β-cells without the need for immunosuppression therapy. In some embodiments, substrates may be employed as hemodialysis membranes.

In an embodiment, substrates may be configured for long-term in vivo implantation for the delivery of pharmaceuticals, therapeutic agents, or other medicaments directly to a biological organism, subject, or patient and can improve compliance with a dosing regimen relative to traditional oral and intravenous delivery methods that need patient or medical personnel intervention. In an embodiment, substrate enclosures may be configured as oral capsules or suppositories. In an embodiment, a substrate may be provided in a gelatin capsule for ease of swallowing. In an embodiment, substrates may be physically coupled with or integrated into a device that ensures contact of the substrate with the skin of a subject for transdermal drug delivery. For example, a device for ensuring contact between a substrate and skin may comprise a pocket for receiving the substrate and microneedles or other relief features for penetrating the stratum and anchoring the device and substrate to the skin of a subject. In an embodiment, a sheath or vascularization device may be provided or surgically placed within a subject and substrates may be inserted into and removed from the sheath or vascularization device. The sheath or vascularization device may, for example, be tubular and rigid, perforated or permeable, so long as it is capable of withstanding forces provided in an in vivo environment. In an embodiment, a sheath or vascularization device may be biocompatible. In an embodiment, a sheath or vascularization device may comprise graphene. Substrates disposed in a sheath or vascularization device may be exchanged in a minimally invasive manner when their contents are depleted or when a substrate captures an analyte for ex vivo analysis. For example, an interior of an enclosure made out of substrate may comprise a molecule (for example, antibody) or substance (for example, chelating agent) that ionically, covalently, or electrostatically binds the analyte, thereby producing a chemical complex having a diameter too large to escape from the enclosure made out of substrate or pass through a barrier made out of the substrate. In an embodiment, the analyte may be bound to an interior surface of an enclosure made from substrate or to a face of the barrier made from the substrate.

In an embodiment, substrates configured to deliver pharmaceuticals, therapeutic agents, or other medicaments directly to a biological environment may be useful for treating chronic medical conditions requiring a substantially continuous, slow release of the pharmaceutical, therapeutic agent or other medicament into the biological environment. In an embodiment, substrates may elute drugs to a biological environment at a rate that may be substantially constant, for example, in accordance with zero-order kinetics.

In an embodiment, the substrates are configured to act as a hemofiltration filter. PCT Application No.

PCTUS2015048205 describes use of substrates as support structures in such filters, the entire disclosure of which is incorporated herein by reference.

In an embodiment, a process of improving the biocompatibility of a track-etched substrate is provided, the process comprising performing a process for modifying a track-etched substrate according to any embodiment herein, on the track-etched substrate to produce a modified track-etched substrate having improved biocompatibility relative to the track-etched substrate. Improvements in biocompatibility may comprise immune system resistance or reduction in toxicity.

In an embodiment, a process of improving the permeability of a track-etched substrate is provided, the process comprising performing a process for modifying a track-etched substrate according to any embodiment herein, on the track-etched substrate to produce a modified track-etched substrate having improved permeability relative to the track-etched substrate. Improvements in permeability may comprise an increase in permeability of about 10, 20, 30, 40, 50, 60, 70, 80, 90, 100, or greater than 100%.

In an embodiment, a process of (a) improving the permeability of a track-etched substrate; and (b) retaining the track-etched substrates ability to support a two dimensional material is provided, the process comprising performing a process for modifying a track-etched substrate according to any embodiment herein, on the track-etched substrate to produce a modified track-etched substrate having improved permeability relative to the track-etched substrate. Improvements in permeability may comprise an increase in permeability of about 1-250%, 250-500%, 500-750%, 750-1,000% or greater than 1,000%. In some embodiments the increase in permeability may be about 300-500%.

EXAMPLES

Example 1: Process for Forming Substrate by Texturing after Track-Etching

Figure 1:
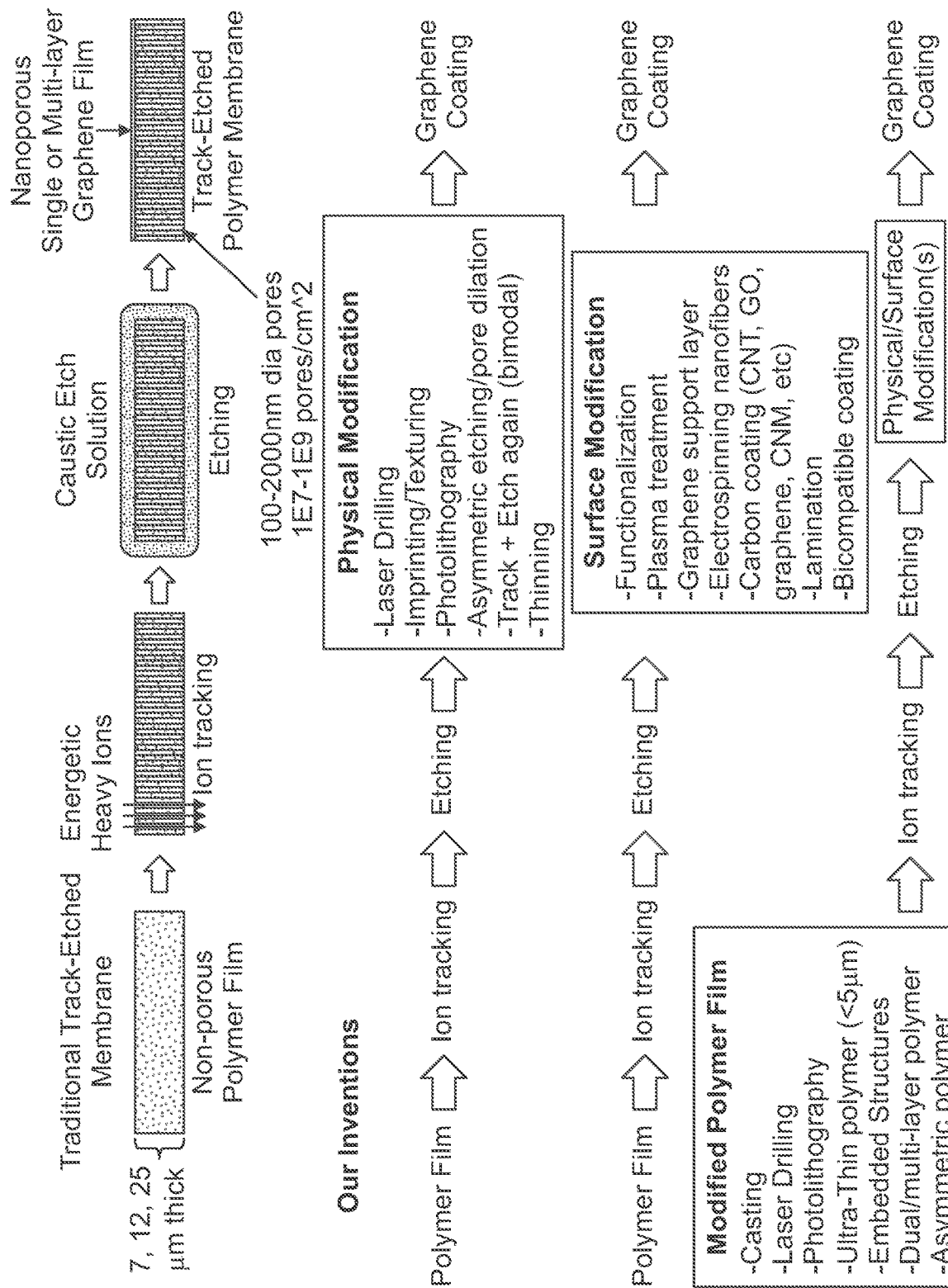
FIG. 1 illustrates a traditional process for producing a track-etched membrane contrasted with some embodiments of a process described herein. A substrate is tracked, for example by bombardment with swift heavy ions, then etched, then the substrate undergoes a physical or surface modification, then coating at one face with the two-dimensional material graphene.
Figure 2:
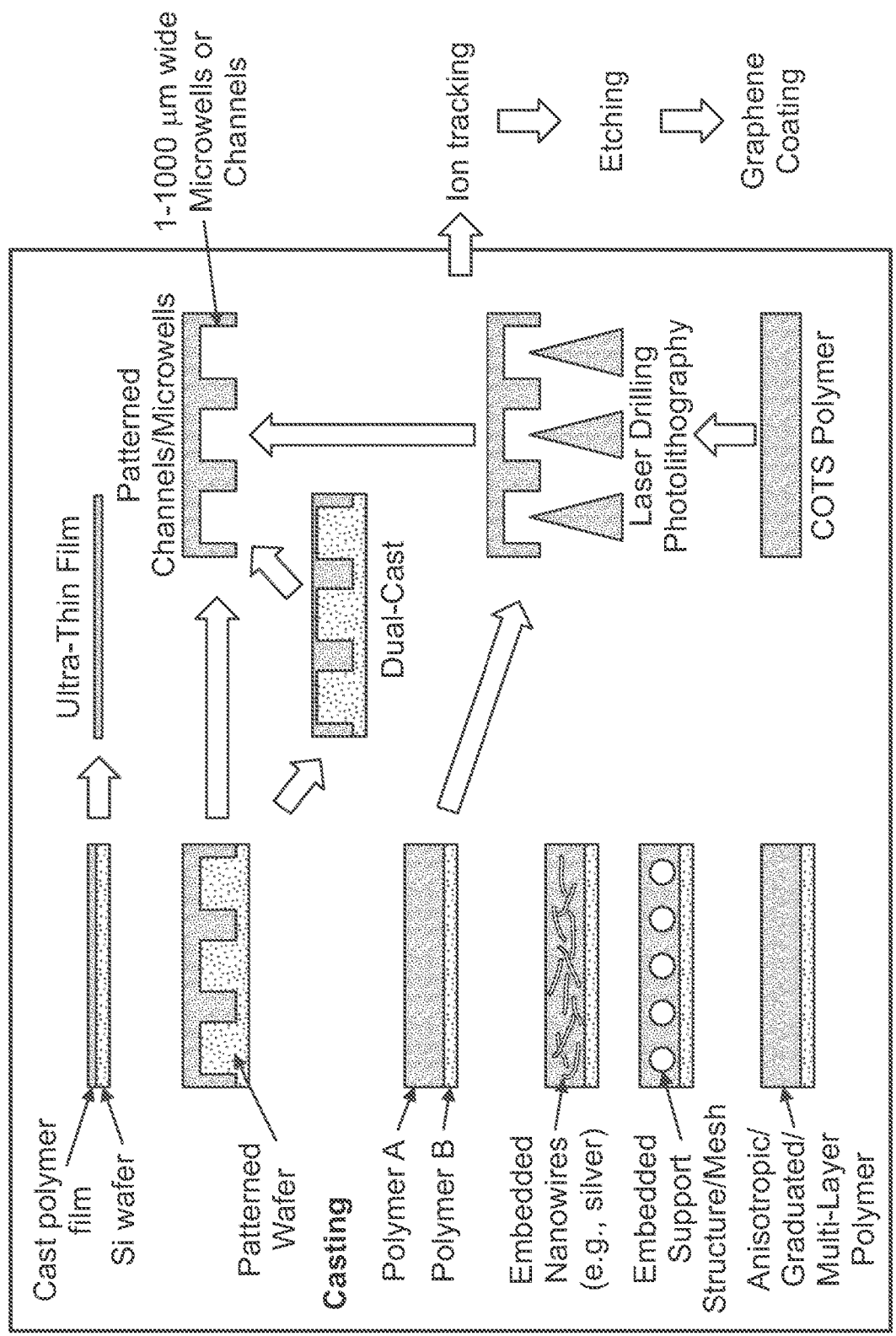
FIG. 2 illustrates some embodiments of a process described herein. Substrates lacking track-etching and containing patterns or wells may be formed by casting or the wells may be laser drilled or photolithographed. The substrates may be cast so as to contain embedded nanowires or support mesh(es) within their thickness. The substrates may then be ion tracked (via bombardment with energetic particles), track-etched, and optionally coated with a two-dimensional material not limited to graphene.

Method: Referring to FIG. 1, a non-porous polymer film made of polyimide may be obtained commercially from DuPont Kapton films or cast from liquid polymer. The non-porous polymer film may be in the shape of a sheet having a thickness of 7, 12, or 25 µm. Damage tracks are formed in the film (or substrate) by bombarding the substrate (or film) with heavy ions. The substrate may then be track-etched by contacting the substrate with a caustic etchant solution.

Figure 3:
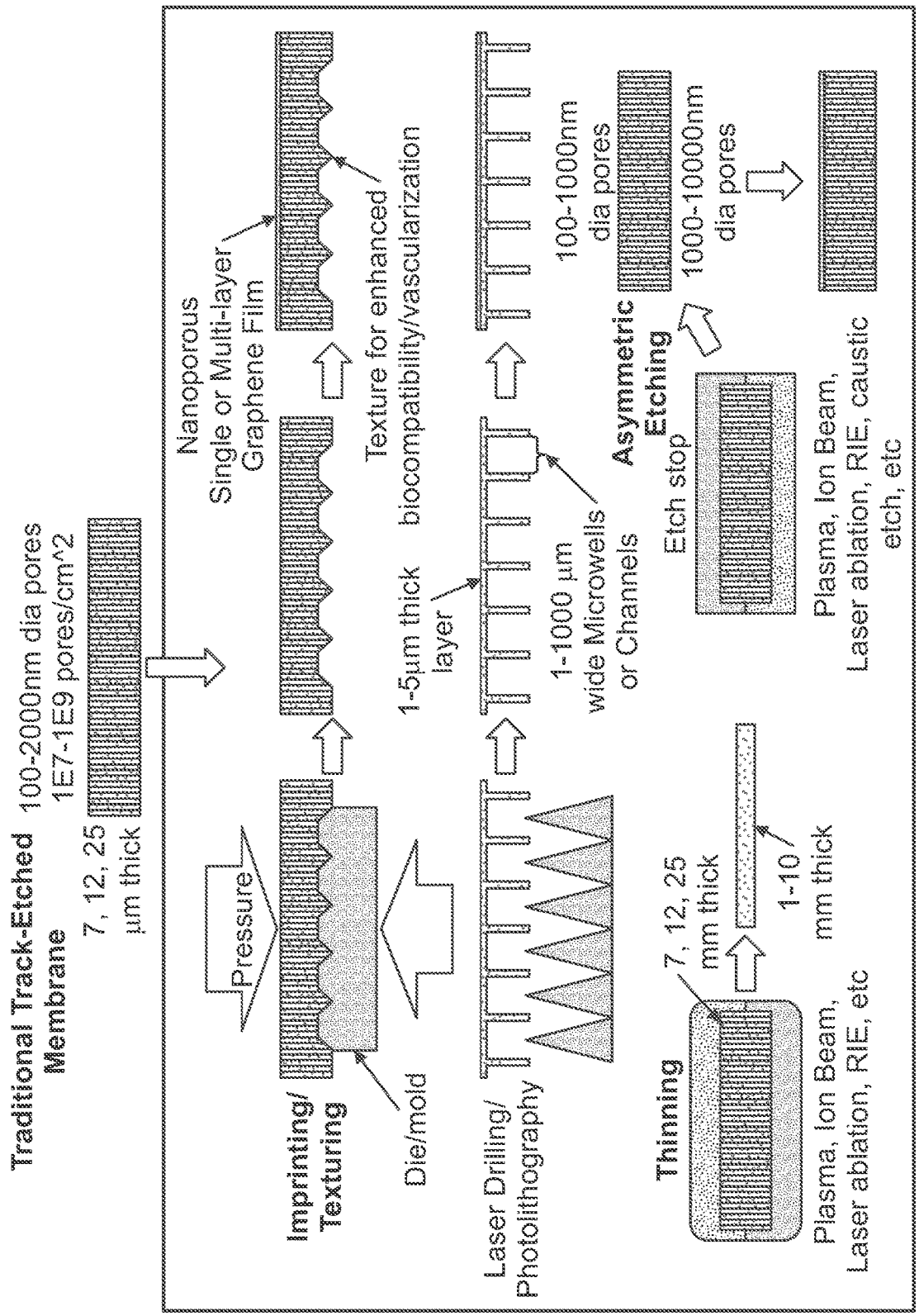
FIG. 3 illustrates some of the physical modifications or treatments of FIG. 1 in accordance with some embodiments. For example, texturing process, laser milling, photolithography, or thinning a track-etched substrate followed by subsequent coating with a two-dimensional material which may be a nanoporous, single or multi-layer graphene film.
Figure 4:
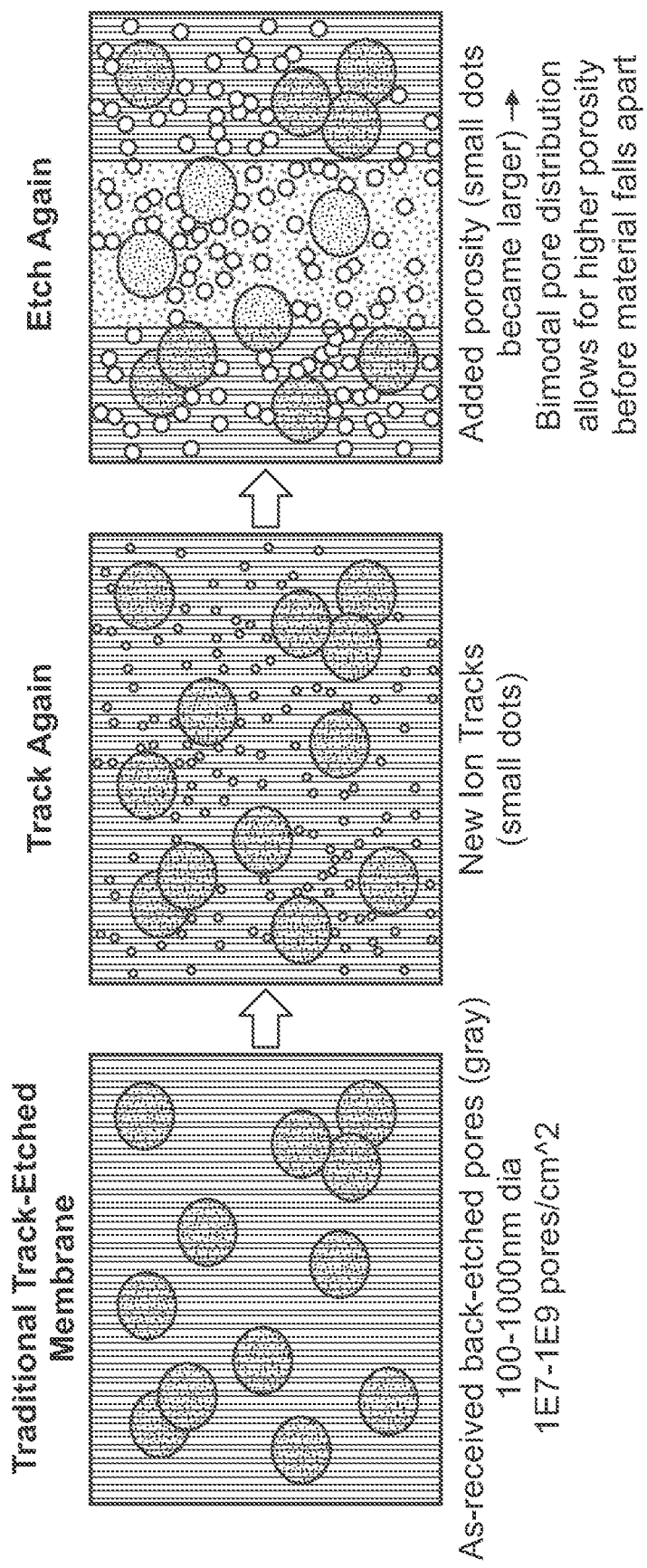
FIG. 4 illustrates bimodal pore distribution obtainable by a process disclosed herein.

The track-etched substrate may then be textured as shown in FIG. 3 by placing it against a mold and applying pressure to the outside of the substrate and/or mold. This may produce a textured shape on the face of the substrate that was pressed against the mold. The non-textured face of the substrate may then be coated with graphene to produce a membrane.

Example 2: Process for Forming Substrate by Laser Milling after Track-Etching

Method: Referring to FIG. 1, a non-porous polymer film made of polyimide may be obtained commercially from DuPont Kapton films or cast from liquid polymer. The non-porous polymer film may be in the shape of a sheet having a thickness of 7, 12, or 25 µm. Damage tracks are formed in the film (or substrate) by bombarding the substrate (or film) with heavy ions. The substrate may then be track-etched by contacting the substrate with a caustic etchant solution.

The track-etched substrate may then be laser milled at a first face as shown in FIG. 3 to produce a plurality of wells in the first face. The wells may have a bottom surface which is 1 to 5µm from the second face of the substrate. The second face of the substrate may then be coated with graphene to produce a membrane.

Example 3: Process for Forming Substrate by Photolithographing after Track-Etching Method: Referring to FIG. 1, a non-porous polymer film made of polyimide may be obtained commercially or cast from liquid polymer. The non-porous polymer film may be in the shape of a sheet having a thickness of 7, 12, or 25 µm. Damage tracks may be formed in the film (or substrate) by bombarding the substrate (or film) with heavy ions. The tracked substrate may then be track-etched by contacting the substrate with a caustic etchant solution.

The track-etched substrate may then be photolithographed at a first face as shown in FIG. 3, to produce a plurality of wells in the first face. The wells may have a bottom surface which is 1 to 5 µm from the second face of the substrate. The second face of the substrate may then be functionalized with graphene to produce a membrane.

Example 4: Process for Forming Substrate by Thinning after Track-Etching

Method: Referring to FIG. 1, a non-porous polymer film. made of polyimide may be obtained commercially from DuPont Kapton films or cast from liquid polymer. The non-porous polymer film may be in the shape of a sheet having a thickness of 7, 12, or 25 µm. Tracks may be formed in the film (or substrate) by bombarding the substrate (or film) with heavy ions. The tracked substrate may then be track-etched by contacting the substrate with a caustic etchant solution.

The track-etched substrate may then be thinned by treatment with plasma as shown in FIG. 3, to produce reduce the thickness of the substrate to 1-10 µm. A face of the substrate may then be functionalized with graphene to produce a membrane.

Example 5: Process for Forming Substrate by Coating after Track-Etching

Method: Referring to FIG. 1, a non-porous polymer film made of polyimide may be obtained commercially from DuPont Kapton films or cast from liquid polymer. The non-porous polymer film may be in the shape of a sheet having a thickness of 7, 12, or 25 µm. Tracks may be formed in the film (or substrate) on a first face by bombarding the substrate (or film) with heavy ions. The tracked substrate may then be track-etched by contacting the substrate's first face with a caustic etchant solution.

The track-etched substrate may then functionalized at its second face by depositing a two-dimensional graphene layer onto the second face. The first face of the substrate may then be coated with a hydrogel, as shown in FIG. 5.

EQUIVALENTS

In an embodiment, substrates or processes can be further modified to incorporate any number of variations, alterations, substitutions or equivalent arrangements not heretofore described, but which are commensurate with the spirit and scope of some embodiments. Such variations, alterations, substitutions include, but are not limited to those described in U.S. patent application Ser. No. 15/099,588, the entire disclosure of which is incorporated by reference. Accordingly, the enclosures and methods are not limited by the foregoing description.

Specific names of compounds are intended to be exemplary, as it is known that one of ordinary skill in the art can name the same compounds differently. When a compound is described such that an isomer or enantiomer of the compound is not specified, for example, in a formula or in a chemical name, that description is intended to include each isomer and enantiomer of the compound described individually or in any combination. One of ordinary skill in the art will appreciate that processes, device elements, starting materials and synthetic methods other than those specifically exemplified can be employed in the practice of the processes herein without resort to undue experimentation. All art-known functional equivalents, of any such methods, processes, device elements, starting materials and synthetic methods are intended to be included herein. Whenever a range is given in the specification, for example, a temperature range, a distance range, an angle range, a time range, or a composition range, all intermediate ranges and subranges, as well as all individual values included in the ranges given. are intended to be included herein. When a Markush group or other grouping is used, all individual members of the group and all combinations and subcombinations possible of the group are intended to be individually included herein.

"About" will be understood by persons of ordinary skill in the art and will vary to some extent depending upon the context in which it is used. If there are uses of the term which. are not clear to persons of ordinary skill in the art, given the context in which it is used, about will mean up to plus or minus 10% of the term. It is to be understood that all numerical values, including ranges, include the term "about" preceding the numerical value or range, although not explicitly stated.

The terms and expressions which have been employed are used as terms of description and not of limitation, and there is no intention in the use of such terms and expressions of excluding any equivalents of the features shown and described or portions thereof, but it is recognized that various modifications are possible within the scope of some embodiments. Thus, it should be understood that although some embodiments have been specifically disclosed, modification and variation of the concepts may be resorted to by those skilled in the art, and that such modifications and variations are considered to be within the scope of the claims.

Al references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the teachings in this application (for example, a reference that is partially inconsistent is incorporated by reference except for the partially inconsistent portion of the reference).

All patents and publications mentioned in the specification are indicative of the levels of skill of those skilled in the art to which the disclosure pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claims.

What is claimed is:

1. A modified substrate comprising:
a first face and an opposite facing second face 3 to 30 µm from each other defining a thickness;
a first plurality of track-etched pores through the substrate; and
a well in the first face of the substrate, wherein the well is from 100 to 1,000 µm in diameter, and wherein the well comprises a bottom surface that is 1 to 10 µm from the second face of the substrate, and wherein the pores have an average diameter between 10-2,000 nm.

2. The modified substrate of claim 1, wherein the first plurality of pores comprises about $1 \times 10^5$ to $1 \times 10^{11}$ pores per cm$^2$ of substrate.

3. The modified substrate of claim 2, wherein the first plurality of pores comprises about $1 \times 10^7$ to $1 \times 10^{10}$ pores per cm$^2$ of substrate and has an average pore diameter between 100-2,000 nm.

4. The modified substrate of claim 2, wherein the first plurality of pores comprises about $1 \times 10^5$ to $1 \times 10^8$ pores per cm$^2$ of substrate.

5. The modified substrate of claim 1, wherein the second face comprises a coating of a two dimensional material or multiple layers thereof, wherein the two dimensional material is selected from graphene, graphene platelets, black phosphorous, hafnium dioxide, molybdenum disulfide, molybdenum diselenide, carbide, a carbon nanomembrane (CNM), carbon nanotubes (CNT), graphyne, borophene, germanene, silicone, Si$_2$BN, stanine, phosphorene, bismuthene, molybdenite, palladium, rhodium, Pb/Sn alloy, Pb/Bi alloy, aerographite, aerogel, nanogel, carbon nanofoam, amorphous carbon and hydrocarbons, hexagonal boron nitride, borocarbonitride, germanane, transition metal dichalcogenide, or any combination thereof.

6. The modified substrate of claim 5, wherein the two dimensional material or multiple layers thereof comprises graphene.

7. The modified substrate of claim 5, wherein the two dimensional material comprises a plurality of perforations therethrough.

8. The modified substrate of claim 5, further comprising an intermediate layer comprising electrospun nanofibers or carbon nanotubes, between the second face and the two dimensional material.

9. The modified substrate of claim 1, wherein the substrate comprises polysulfones, polyurethane, polymethylmethacrylate (PMMA), polyglycolid acid (PGA), polylactic acid (PLA), polyethylene glycol (PEG), polylactic-co-glycolic acid (PLGA), polyamides, polyimides, polypropylene, polyethersulfones (PES), polyvinylidine fluoride (PVDF), cellulose acetate, polyethylene, polyethylene terephthalate (PET), polypropylene, polycarbonate, polytetrafluoroethylene (PTFE), polyvinylchloride (PVC), polyether ether ketone (PEEK), polycaprolactone, polydimethylsiloxane (PDMS), block co-polymers of any thereof, or mixtures of any two or more thereof.

10. The modified substrate of claim 1, further comprising nanowires or a support mesh embedded therein.

11. The modified substrate of claim 1, wherein the modified substrate is comprised of two or more materials anisotropically arranged or present in a gradient.

12. The modified substrate of claim 1, wherein the first plurality of pores comprises pores having a diameter at the first face that is between 5-20% greater than their diameter at the second face.

13. The modified substrate of claim 1, further comprising a second plurality of pores therethrough, wherein the second plurality of pores comprises pores having an average diameter of up to 50% the average diameter of the pores of the first plurality of pores and wherein the second plurality of pores is comprised of $1 \times 10^7$ to $1 \times 10^{13}$ pores per cm$^2$ of substrate.

14. The modified substrate of claim 13, wherein the pores of the first and/or second pluralities of pores comprise a diameter at the first face that is between 5-20% greater than their diameter at the second face.

15. The modified substrate of claim 13, wherein the modified substrate has a porosity of between 20-50%.

16. The modified substrate of claim 15, wherein the porosity is between 35% to 50%.

17. The modified substrate of claim 1, wherein the first face further comprises functionalization, texturing, additional etching, plasma treatment, or a coating.

18. The modified substrate of claim 17, wherein the coating is selected from a hydrogel, non-porous graphene, graphene oxide, carbon nanotubes or electrospun nanofibers.

19. The modified substrate of claim 1, wherein all of the bottom surface is 1 to 10 μm from the second face of the substrate.

20. A modified substrate comprising:
a first face and an opposite facing second face 6 to 30 μm from each other defining a thickness;
a first plurality of pores through the substrate, comprising about $1 \times 10^5$ to $1 \times 10^{11}$ pores per cm$^2$ of substrate and pores having an average diameter between 10-10,000 nm; and
a second plurality of pores through the substrate, comprising pores having an average diameter of 1% to 50% the average diameter of the pores of the first plurality of pores, wherein the second plurality of pores is comprised of $1 \times 10^7$ to $1 \times 10^{13}$ pores per cm$^2$ of substrate,
wherein the second face comprises a coating of a two dimensional material or multiple layers thereof, wherein the two dimensional material is selected from graphene, graphene platelets, black phosphorous, hafnium dioxide, molybdenum disulfide, molybdenum diselenide, carbide, a carbon nanomembrane (CNM), a carbon nanotube (CNT), amorphous carbon and hydrocarbons, graphyne, borophene, germanene, silicone, Si$_2$BN, stanine, phosphorene, bismuthene, molybdenite, palladium, rhodium, Pb/Sn alloy, Pb/Bi alloy, aerographite, aerogel, nanogel, carbon nanofoam, hexagonal boron nitride, borocarbonitride, germanane, transition metal dichalcogenide, or any combination thereof.

21. The modified substrate of claim 20, wherein the pores of the first and/or second pluralities of pores have a diameter at the first face that is between 5-20% greater than their diameter at the second face.

22. The modified substrate of claim 20, wherein the porosity is between 35% to 50%.

23. The modified substrate of claim 20, wherein the two dimensional material comprises graphene.

24. The modified substrate of claim 20, wherein the two dimensional material comprises a plurality of perforations therethrough.

25. The modified substrate of claim 20, further comprising an intermediate layer comprising electrospun nanofibers between the second face and the two dimensional material.

26. The modified substrate of claim 20, wherein the substrate comprises polysulfones, polyurethane, polymethylmethacrylate (PMMA), polyglycolid acid (PGA), polylactic acid (PLA), polyethylene glycol (PEG), polylactic-co-glycolic acid (PLGA), polyamides, polyimides, polypropylene, polyethersulfones (PES), polyvinylidine fluoride (PVDF), cellulose acetate, polyethylene, polyethylene terephthalate (PET), polypropylene, polycarbonate, polytetrafluoroethylene (PTFE), polyvinylchloride (PVC), polyether ether ketone (PEEK), polycaprolactone, polydimethylsiloxane (PDMS), block co-polymers of any thereof, or mixtures of any two or more thereof.

27. The modified substrate of claim 20, further comprising nanowires or a support mesh embedded therein.

* * * * *